US010725409B1

(12) United States Patent
Sato

(10) Patent No.: US 10,725,409 B1
(45) Date of Patent: Jul. 28, 2020

(54) FIXING DEVICE, IMAGE FORMING APPARATUS AND RECORDING MEDIUM

(71) Applicant: TOSHIBA TEC KABUSHIKI KAISHA, Tokyo (JP)

(72) Inventor: Koichiro Sato, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/273,892

(22) Filed: Feb. 12, 2019

(51) Int. Cl.
*G03G 15/20* (2006.01)
*G06K 19/077* (2006.01)
*G03G 15/00* (2006.01)

(52) U.S. Cl.
CPC ..... *G03G 15/2064* (2013.01); *G03G 15/2032* (2013.01); *G03G 15/607* (2013.01); *G06K 19/07758* (2013.01); *G03G 2215/00721* (2013.01)

(58) Field of Classification Search
USPC .......................................................... 399/67
See application file for complete search history.

(56) References Cited

U.S. PATENT DOCUMENTS

| 2007/0212085 | A1* | 9/2007 | Mitsuya | G03G 15/5029 |
| | | | | 399/45 |
| 2008/0031665 | A1* | 2/2008 | Kito | G03G 15/6588 |
| | | | | 399/335 |
| 2011/0222874 | A1* | 9/2011 | Yamada | G03G 15/206 |
| | | | | 399/33 |
| 2018/0067425 | A1 | 3/2018 | Watanabe | |
| 2018/0259890 | A1* | 9/2018 | Onodera | G03G 15/50 |

FOREIGN PATENT DOCUMENTS

| JP | 10126606 A | * | 5/1998 |
| JP | 2006035756 A | * | 2/2006 |
| JP | 2007206161 A | * | 8/2007 |
| JP | 2009122467 A | * | 6/2009 |

* cited by examiner

*Primary Examiner* — Quana Grainger
(74) *Attorney, Agent, or Firm* — Kim & Stewart LLP

(57) ABSTRACT

A fixing device for fixing a toner image to a recording medium, such as a sheet of paper, includes a fixing element, a press roller to press against the fixing element and form a nip through which the sheet passes, and a pressure control mechanism configured to control a pressing of the press roller against the fixing element according to a position of a radio frequency identification (RFID) tag embedded in the sheet such that a pressure of the press roller against the fixing element is at a first pressure when a RFID region of the sheet passes through the nip and at a second pressure otherwise, the first pressure being less than the second pressure.

20 Claims, 24 Drawing Sheets

US 10,725,409 B1

FIXING DEVICE, IMAGE FORMING APPARATUS AND RECORDING MEDIUM

FIELD

Embodiments described herein relate generally to a fixing device, an image forming apparatus and a recording medium.

BACKGROUND

In recent years, recycled paper is increasingly used for printing in consideration of environmental concerns. In general, when recycled paper is used as a recording medium the quality of the image printed is lessened as compared to when standard paper is used. Also, printed image quality may vary depending on the recycled content ratio or recycled component types used in the recycled paper.

A user can improve the final print quality of a printed image by adjusting printing conditions for each recording medium type used. However, it is typically troublesome to check the type of the recording medium being used and then to set the printing condition for each recording medium accordingly.

In order to eliminate requirement for the user to perform the necessary setting adjustment for each printing, a technology has been developed in which a radio frequency identification (RFID) tag storing information regarding the recycled paper is embedded in the paper, and the information stored in the RFID tag can be read by multi-function peripherals to permit automatically changing of printing conditions to those appropriate for the recycled paper type.

The RFID tag includes an integrated circuit (IC) chip and an antenna. In general, an RFID tag may be easily damaged if the IC chip is heated to a high temperature or if the antenna portion is subjected to a strong pressing force. When the recording medium having an RFID tag embedded therein passes through a fixing device during a printing operation of a multi-function peripheral or the like, the RFID tag embedded in the recording medium is heated and pressed. Therefore, the RFID tag embedded in the recording medium may be damaged by the fixing device.

DETAILED DESCRIPTION

Embodiments prevent damage of an RFID tag embedded in a recording medium, such as paper used for image printing.

According to one embodiment, a fixing device includes a fixing element, a press roller configured to press against the fixing element to form a nip through which a sheet to be printed passes, and a pressure control mechanism configured to control a pressing of the press roller against the fixing element according to a position of a radio frequency identification (RFID) tag embedded in the sheet such that a pressure of the press roller against the fixing element is at a first pressure when a RFID region of the sheet including the RFID tag passes through the nip and at a second pressure otherwise. The first pressure is less than the second pressure.

Hereinafter, an image forming apparatus and aspects thereof according to various example embodiments will be described with reference to the drawings. For purposes of description, an XYZ axis system is used for describing positional relationships of components in the depicted examples.

First Embodiment

An image forming apparatus 10 according to the first embodiment is a multi-function peripheral (MFP).

Figure 1:
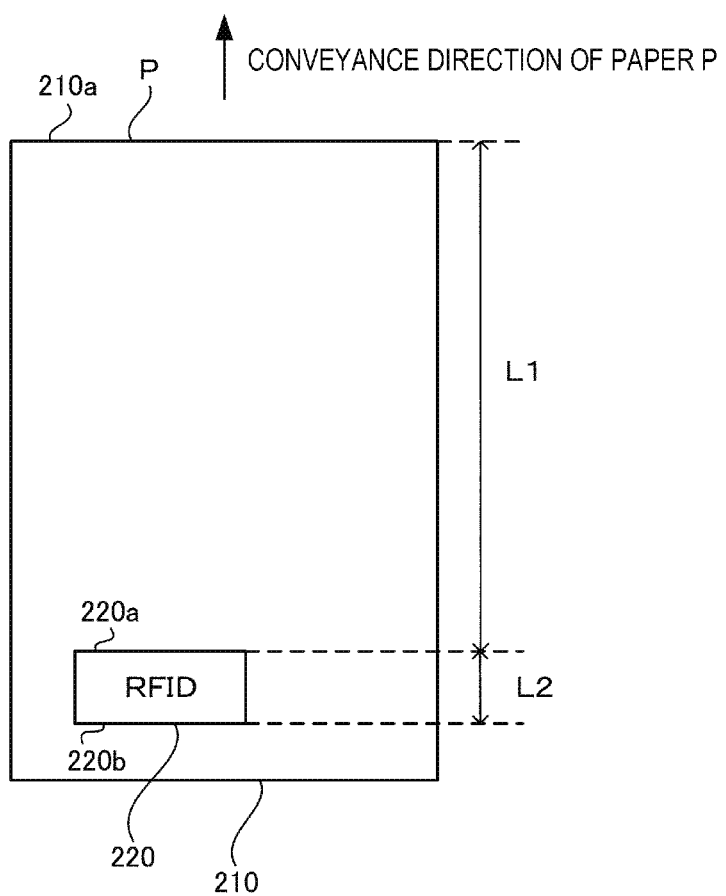
FIG. 1 depicts a recording medium according to a first embodiment.
Figure 2:
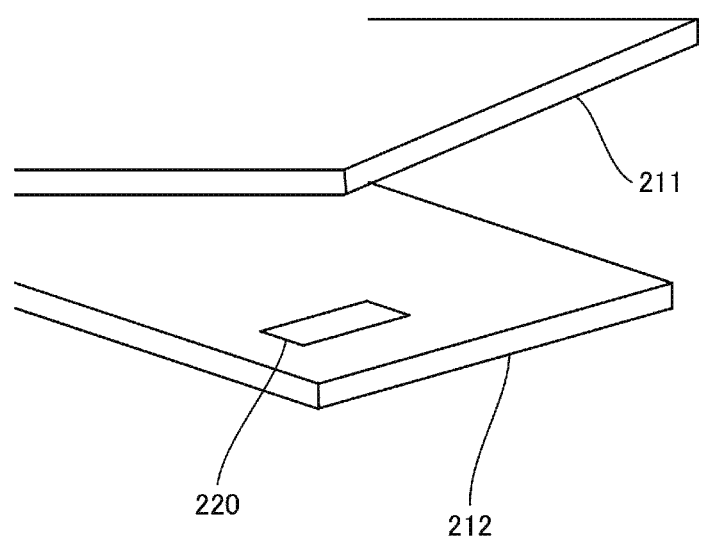
FIG. 2 is a view depicting aspects of a recording medium.

Paper P Paper P can be used for printing by the MFP 10. As illustrated in FIGS. 1 and 2, the paper P is formed of paper 210 and RFID tag 220 (referred to, for simplicity, as RFID 220 hereafter). The paper 210 is composed of upper paper 211 and lower paper 212. The RFID 220 is disposed between the upper paper 211 and the lower paper 212. A distance in the conveyance direction from a leading end 210a of the paper P to a position where the RFID 220 is embedded is L1. In addition, a distance in the conveyance direction from the front end 220a to a rear end 220b of the RFID 220 is L2.

Figure 3:
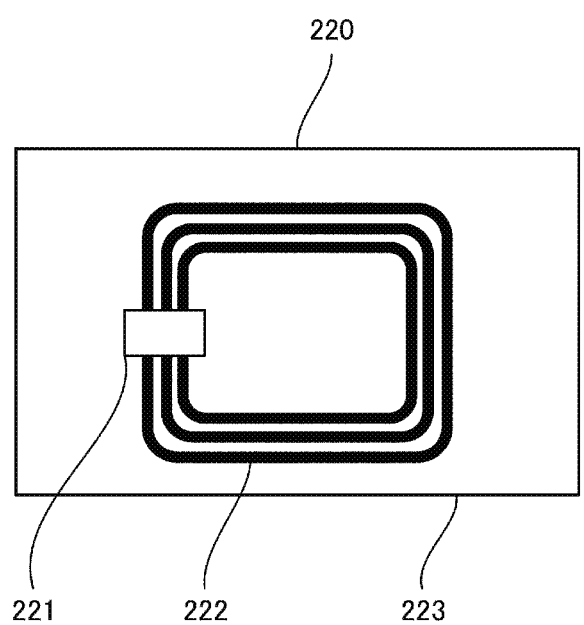
FIG. 3 is a view depicting aspects of the recording medium.

As illustrated in FIG. 3, the RFID 220 is embedded in amount 223. The antenna 220 is connected to the IC chip 221. The RFID 220 performs communication using a non-contact (wireless) communication method called near field communication (NFC). For example, the RFID 220 operates based on a standard specified in ISO/IEC 1443 or ISO/IEC 18092. In the RFID 220, information such as the components included in recycled paper (paper P) is recorded.

MFP

Figure 4:
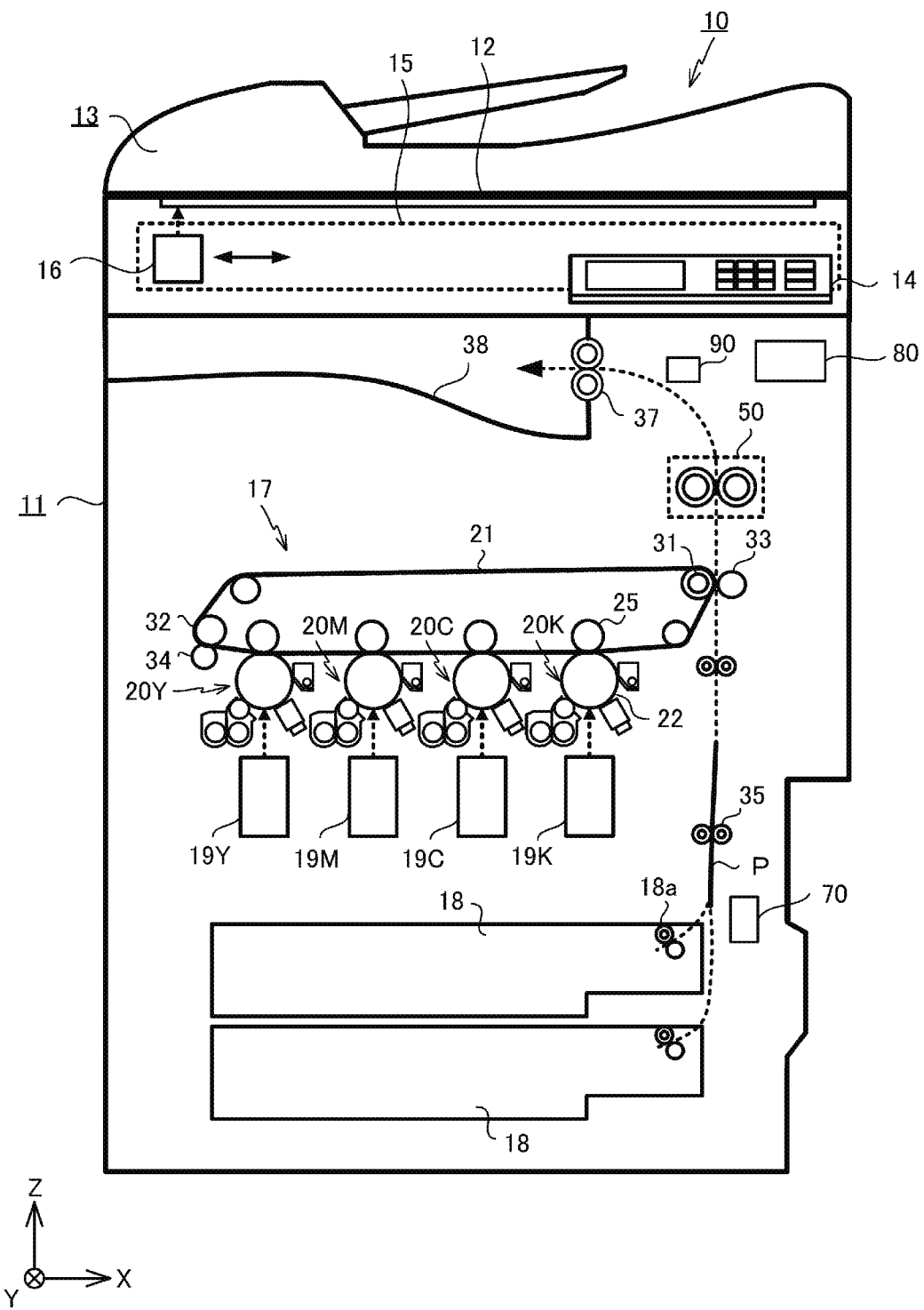
FIG. 4 is a view schematically illustrating a configuration of an image forming apparatus according to a first embodiment.

Next, the MFP 10 using the paper P (including the RFID 220 embedded therein) as a printing medium will be described. FIG. 4 is a view schematically illustrating the configuration of the MFP 10 according to the first embodiment. The MFP 10 includes a main body 11 and an auto document feeder (ADF) 13. An original document platen 12 formed of transparent glass is disposed at an upper portion of the main body 11 and the ADF 13 is provided on the upper surface side of the original document platen 12. The ADF 13 is hinged (or the like) to the main body 11 and can be opened to expose the original document platen. An operation panel 14 is provided at the upper portion of the main body 11. In addition, a scanner 15 for reading an original document is provided below the original document platen 12.

Figure 5:
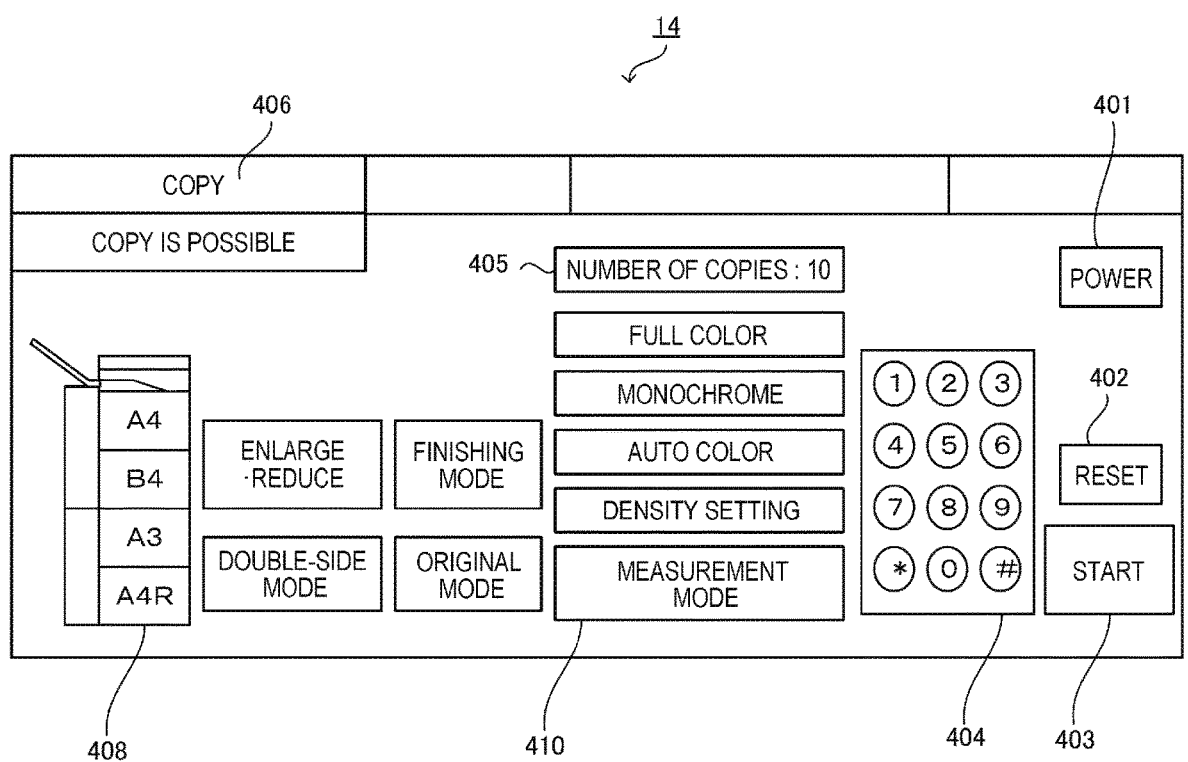
FIG. 5 depicting aspects of a GUI screen.

The operation panel 14 includes various types of keys, buttons, a graphical user interface (GUI) or the like. FIG. 5 illustrates an example of a GUI screen displayed on the operation panel 14 including a touch panel to receive user selections and inputs. As illustrated in FIG. 5, a power button 401, a reset button 402, a printing start button 403, a ten key 404, a field 405 for displaying the number of copies, a function display field 406, a FIG. 408 indicating the position of a paper feed cassette and the like are provided on the GUI screen. Various keys for setting the printing conditions are provided on the GUI screen. In addition, a measurement mode key 410 is provided on the GUI screen. In this context, the "measurement mode" is a mode for measuring the embedded position of the RFID 220 in the paper P. Specifically, this is a mode for measuring the distances L1 and L2 illustrated in FIG. 1.

The scanner 15 reads an original document fed by the ADF 13 or a document placed on the original document platen 12 and generates image data. The scanner 15 includes an image sensor 16.

The image sensor 16 reads the original document on the original document platen 12 while moving (in a +X direction) along the underside of original document platen 12, if an image of a document placed on the original document platen 12 is being acquired. When images of documents supplied by the ADF 13 are being read, the image sensor 16 is maintained (fixed) at the position illustrated in FIG. 4 to read each of the sequentially fed documents from the ADF.

The main body 11 includes an image forming unit 17, a fixing device 50, a sensor 70, a control device 80, and a reader-writer 90.

Image Forming Unit

The image forming unit 17 is disposed inside the main body 11. The image forming unit 17 forms an image on a recording medium, such as paper, stored in a paper feed cassette 18. The image formed on the recording medium may be based on image data read by the scanner 15 or image data created by a personal computer or the like.

The image forming unit 17 includes image forming units 20Y, 20M, 20C and 20K for forming latent images using, respectively toners of yellow (Y), magenta (M), cyan (C) and black (K).

Scanning heads 19Y, 19M, 19C and 19K are provided in respective correspondence with the image forming units 20Y, 20M, 20C and 20K. An intermediate transfer belt 21 is provided in the image forming unit 17.

The image forming units 20Y, 20M, 20C and 20K are disposed below the intermediate transfer belt 21. In the image forming unit 17, the image forming units 20Y, 20M, 20C and 20K are arranged from the −X side to the +X side. The scanning heads 19Y, 19M, 19C and 19K are disposed below (−Z side) the image forming units 20Y, 20M, 20C and 20K, respectively.

Figure 6:
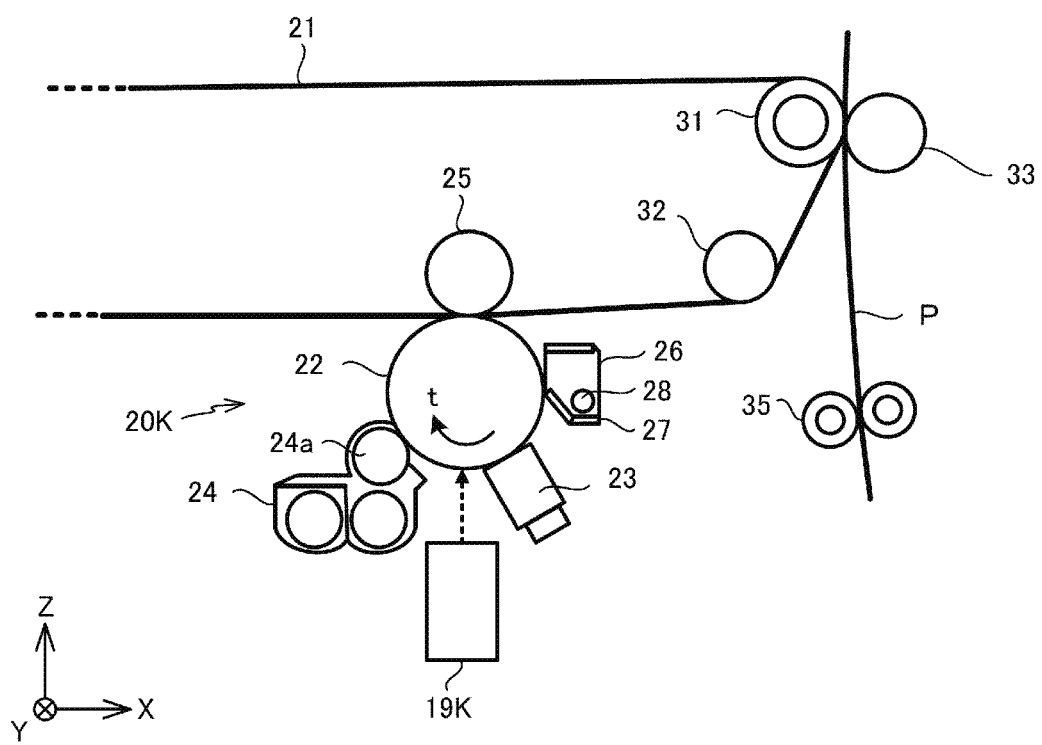
FIG. 6 is a view illustrating a configuration of an image forming unit.

FIG. 6 is an enlarged view of the image forming unit 20K selected from among the image forming units 20Y, 20M, 20C and 20K as a representative of each since the image forming units 20Y, 20M, 20C and 20K each have the same configuration. Therefore, the configuration of each image forming (20Y, 20M, 20C and 20K) unit will be described using the image forming unit 20K as an example.

The image forming unit 20K includes a photosensitive drum 22 as an image carrier. A charger 23, a developing device 24, a primary transfer roller 25, a cleaner 26 and the like are disposed around the photosensitive drum 22 in the direction indicated by arrow t. Laser light is irradiated from the scanning head 19K to an exposure position on the photosensitive drum 22. By irradiating the surface of the rotating photosensitive drum 22, a latent image can be formed on the surface of the photosensitive drum 22.

The charger 23 uniformly charges the surface of the photosensitive drum 22. The developing device 24 supplies a toner to the photosensitive drum 22 from a developing roller 24a to which a developing bias is applied. The supplied toner develops the electrostatic latent image. The cleaner 26 removes excess toner from the surface of the photosensitive drum 22 using a blade 27. The toner scraped off at the front end of the blade 27 is conveyed by an auger 28 in a longitudinal direction.

As illustrated in FIG. 4, the intermediate transfer belt 21 stretches over a drive roller 31 and three driven rollers 32. As illustrated in FIG. 4, the intermediate transfer belt 21 rotates in a counterclockwise direction according to rotation of the drive roller 31. In addition, as illustrated in FIG. 4, the intermediate transfer belt 21 is in contact with the upper surfaces of the photosensitive drums 22 of the image forming units 20Y, 20M, 20C and 20K. A primary transfer voltage is applied by primary transfer rollers 25 at positions of the intermediate transfer belt 21 facing each photosensitive drum 22. Therefore, the toner image formed on the surface of the photosensitive drum 22 is transferred onto the intermediate transfer belt 21, which is referred to as a primary transfer.

A secondary transfer roller 33 is disposed to face the drive roller 31 with the intermediate transfer belt 21 therebetween. When paper P passes between the drive roller 31 and the secondary transfer roller 33, a secondary transfer voltage is applied to the paper P by the secondary transfer roller 33. Therefore, the toner image formed on the intermediate transfer belt 21 is transferred onto the paper P, which is referred to as a secondary transfer. As illustrated in FIG. 4, a belt cleaner 34 is provided near a driven roller 32. The toner remaining on the surface of the intermediate transfer belt 21 after the secondary transfer is removed by the belt cleaner 34.

As illustrated in FIG. 4, a feed roller 35 is provided between the feed cassette 18 and the secondary transfer roller 33. The paper P taken out from the feed cassette 18 by a pickup roller 18a, which is near the feed cassette 18, is conveyed to a position between the intermediate transfer belt 21 and the secondary transfer roller 33 by the feed roller 35.

A fixing device 50 is provided above the secondary transfer roller 33. In addition, a paper discharge roller 37 is provided above the fixing device 50. The paper P passing through the intermediate transfer belt 21 and the secondary transfer roller 33 is heated by the fixing device 50 to fix the toner image to the paper P. The paper P is then discharged to a paper discharge part 38 by the paper discharge roller 37.

Figure 7:
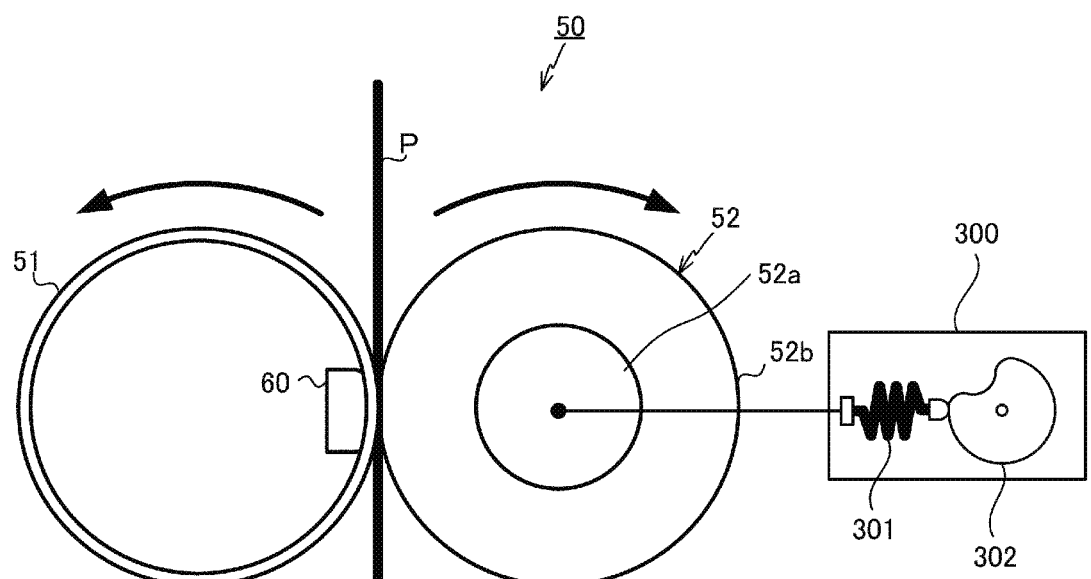
FIG. 7 is a view illustrating a configuration of a fixing device.

Fixing Device FIG. 7 is a view illustrating an example of the fixing device 50. The fixing device 50 includes a fixing belt 51, a pressure roller 52, a heater 60 and a pressure control mechanism 300. The heater 60 is provided on an inner surface side of the fixing belt 51. The fixing belt 51 in conjunction with the heater 60 heats the paper P.

The fixing belt 51 is a fixing element formed as a cylindrical member having a width along the Y-axis direction that is somewhat greater than the width (in a direction orthogonal to the conveyance direction) of the paper P. As the fixing belt 51, for example, a film made of stainless steel (SUS) having a thickness 50 μm or polyimide having a thickness of 70 μm is used as a base material. A silicone rubber layer having a thickness 200 μm is typically formed on the surface of the base material. The silicone rubber layer is typically covered with a surface protective layer made of perfluoroalkoxy (PFA) resin or the like. The fixing belt 51 is supported to be rotated about an axis parallel to the Y-axis.

The pressure roller 52 is a cylindrical member having a longitudinal direction along a Y-axis direction. The pressure roller 52 includes a core material 52a (made of metal such as aluminum) and a silicone rubber layer 52b. The silicone rubber layer 52b is laminated on the outer circumferential surface of the core material 52a. The surface of the silicone rubber layer 52b is covered with PFA resin or the like. In this example, the pressure roller 52 has an outer diameter of about 25 mm and has the substantially same width (in a direction orthogonal to the conveyance direction) as the fixing belt 51. The pressure roller 52 is biased by the pressure control mechanism 300 in a direction (–X direction) towards the fixing belt 51. Therefore, the pressure roller 52 is pressed against the heater 60 with the fixing belt 51 therebetween. Accordingly, the surface of the pressure roller 52 and the surface of the fixing belt 51 are brought into tight contact with each other and a nip is formed through which the paper P passes.

The pressure control mechanism 300 controls the pressing (pressure) of the pressure roller 52 against the fixing belt 51. Specifically, the pressure control mechanism 300 controls, according to the control by the control device 80, the pressing of the pressure roller 52 against the fixing belt 51 to be a first pressure when a RFID-containing region of the paper P including the RFID 220 passes through the nip and a second pressure, greater than the first pressure, when a non-RFID-containing region of the paper P passes through the nip. In general, in this context, the first pressure is generally less than a standard fixing pressure provided by the pressure roller 52 in normal printing operations.

Figure 8:
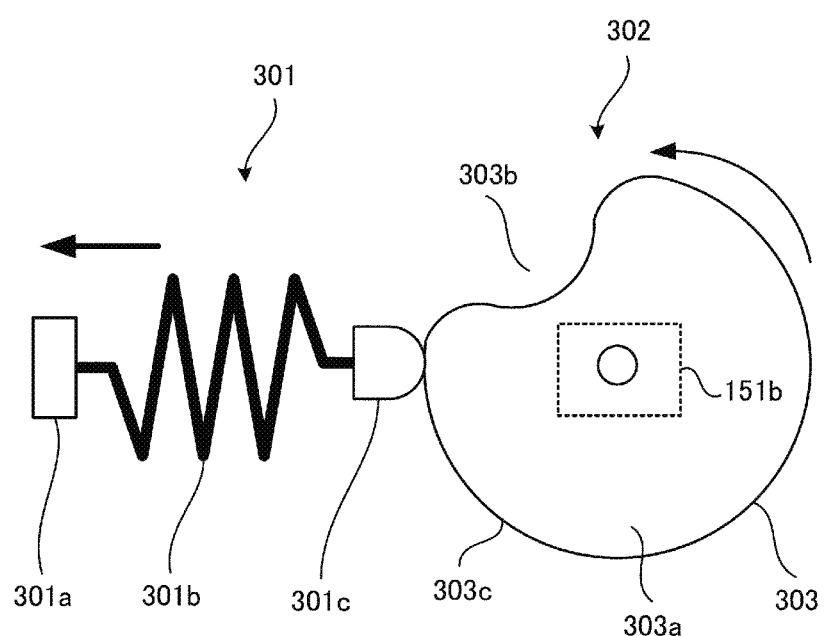
FIG. 8 is a view depicting aspects of a pressure control mechanism.

FIG. 8 is a schematic view illustrating the structure of the pressure control mechanism 300. The pressure control mechanism 300 includes an elastic unit 301 and a drive unit 302. The elastic unit 301 includes a connection part 301a, an elastic body 301b and a contact part 301c. The elastic body 301b is, for example, a spring. The connection part 301a is connected to the core material 52a of the pressure roller 52. The contact part 301c is a member contacting the outer circumference of a cam 303. The contact part 301c moves back and forth in the X-axis direction illustrated in FIG. 8 according to rotation of the cam 303. Accordingly, the elastic unit 301 changes the pressure applied (in the –X direction) to the pressure roller 52.

The drive unit 302 includes the cam 303 and a drive motor 151b for driving the cam 303. The drive motor is controlled by control device 80 to rotate the cam 303. The cam 303 is formed of a disk-shaped member having a generally circular cross section incorporating a concave part 303b formed in a portion of the outer circumference of a main body 303a. The depth of the concave part 303b is, for example, several millimeters (mm) towards the center of the main body 303a from a concave part 303c of the main body 303a.

As illustrated in FIG. 8, when the contact part 301c is in contact with the convex part 303c, the elastic body 301b is pressed by the convex part 303c in the –X direction. Therefore, the pressure roller 52 is brought into contact with the fixing belt 51 with a strong pressure (e.g., the second pressure). Any portions of the cam 303 other than the concave part 303b can be considered to be the convex part 303c of the cam 303.

Figure 9:
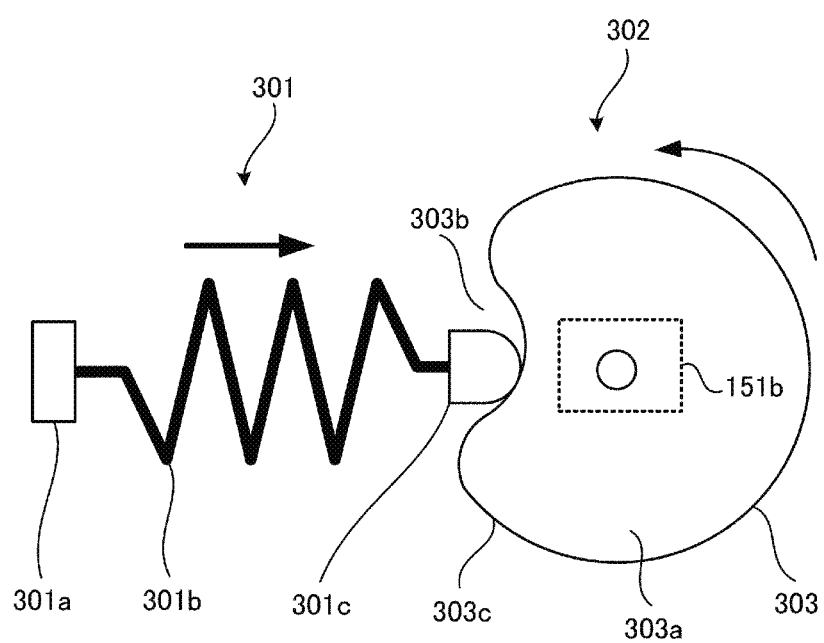
FIG. 9 is a view depicting aspects of a pressure control mechanism.

As illustrated in FIG. 9, if the contact part 301c is in contact with the concave part 303b, the pressure applied to the elastic body 301b by the cam 303 is reduced. Therefore, the pressure roller 52 is pressed towards the fixing belt 51 with a lesser pressure (e.g., the first pressure) that is less than the second pressure. Here, the "first pressure" refers to a pressure which does not damage the RFID 220. As the depth of the concave part 303b increases, the first pressure decreases.

Figure 10:
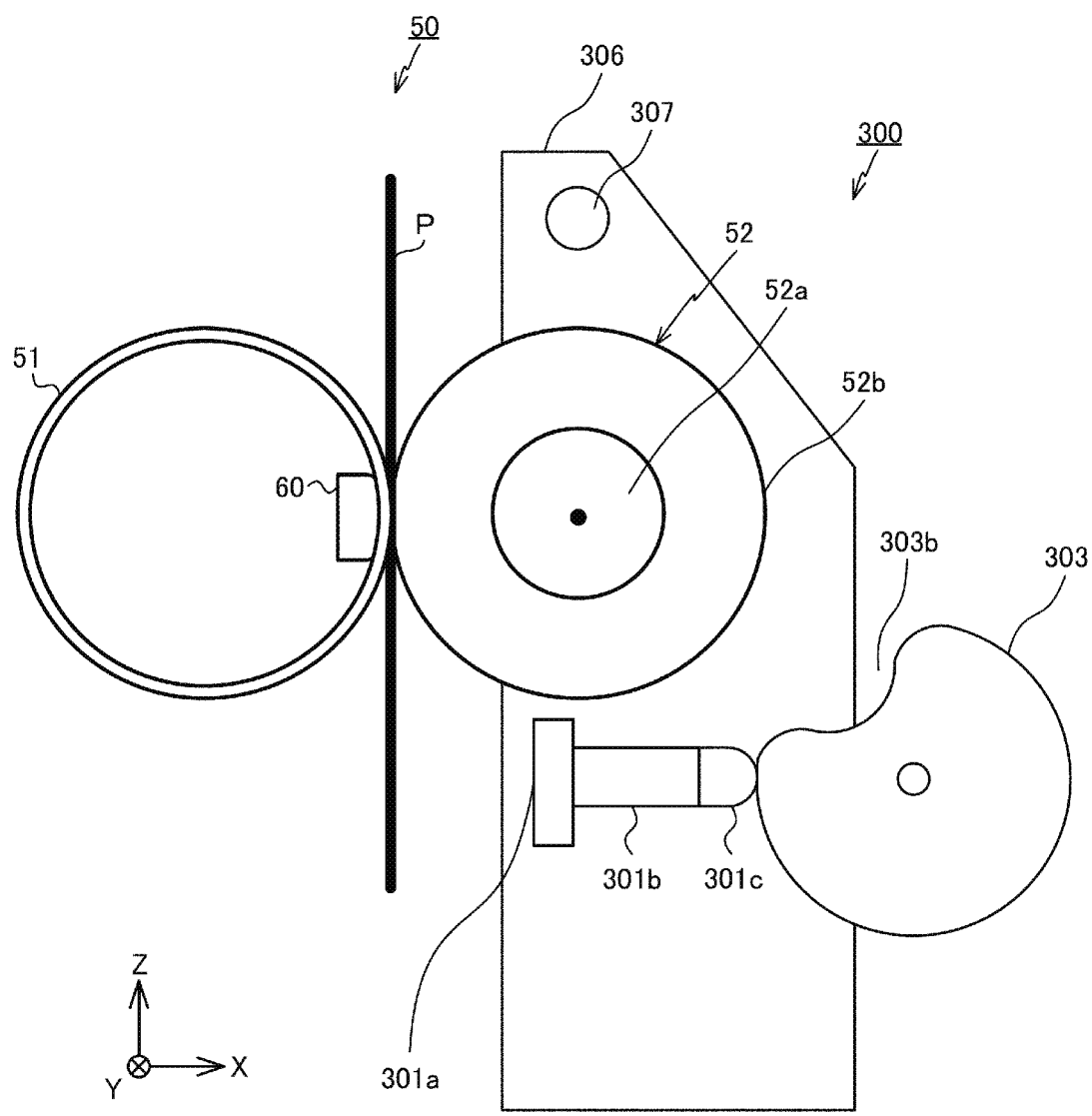
FIG. 10 is a view depicting aspects of a pressure control mechanism.

FIG. 10 illustrates an example of amounting of the pressure control mechanism 300. The core material 52a of the pressure roller 52 and the connection part 301a are fixed to a plate 306. The plate 306 is formed in a trapezoidal shape and includes a hole 307 in one end thereof. The plate 306 is rotatably fixed to a case 305 using the hole 307. The cam 303 is supported by the drive motor 151b.

In the fixing device 50, the paper P passes through the nip between the pressure roller 52 and the fixing belt 51, which each rotate in the directions indicated by respective arrows of FIG. 7 due to rotation of the pressure roller 52. In the nip the paper P is heated and pressed, and the toner image formed on the paper P is fixed to the paper P.

A sensor 70 (see FIG. 4) detects the conveyed paper P. As illustrated in FIG. 4, the sensor 70 is disposed at the upstream side (in the conveyance direction) of the fixing device 50. The sensor 70 notifies the control device 80 of the time at which the leading end 210a of the paper P passed through the sensor 70. For example, the sensor 70 is provided near the feed cassette 18 or along a paper conveyance path.

Figure 11:
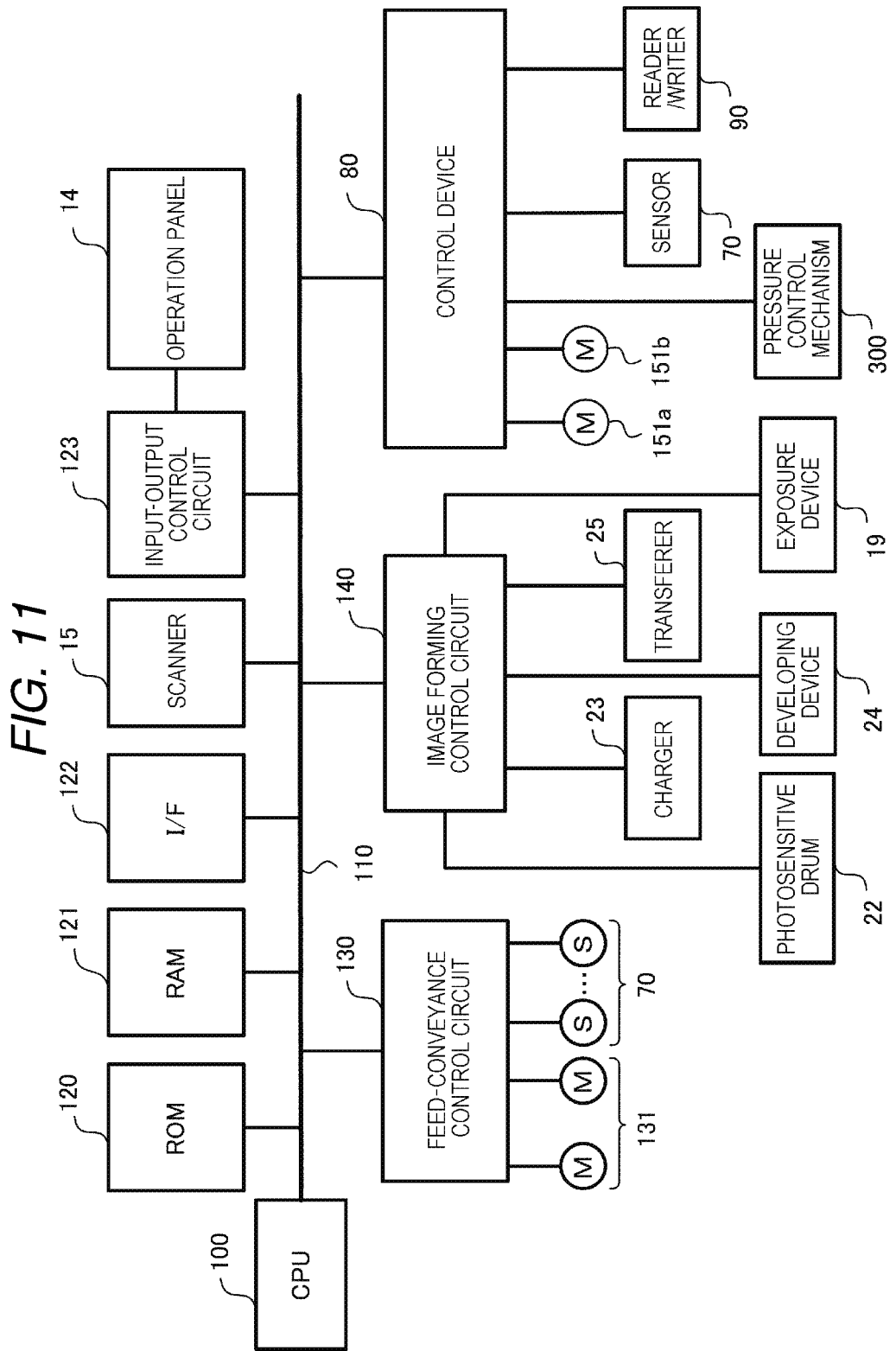
FIG. 11 is a block diagram of a control system of an image forming apparatus.

FIG. 11 is a block diagram of a control system configuring the MFP 10. The control system includes a CPU 100 for performing overall control of the image forming apparatus, a bus 110, a read only memory (ROM) 120, a random access memory (RAM) 121, an interface 122, a scanner 15, an input-output control circuit 123, a feed-conveyance control circuit 130, an image forming control circuit 140 and a control device 80. The CPU 100 and each above-mentioned circuit and element are connected through the bus 110.

The ROM 120 stores a control program and control data defining the basic operations during image forming.

The RAM 121 functions as a working memory area of the CPU 100.

The CPU 100 executes a program stored in the ROM 120. The components of the MFP 10 are collectively controlled by the CPU 100 and the process of forming an image on the paper P is executed.

The interface 122 performs communication with an external device such as a user terminal. The interface 122 includes a wireless communication circuit (such as a wireless LAN), a wired communication circuit, a communication circuit for connecting to a removable recording medium (such as a universal serial bus (USB) memory) and the like. The interface 122 transmits position information for the RFID 220 in the paper P to an arbitrary information processing apparatus.

The input-output control circuit 123 displays information on the operation panel 14 or receives input from the operation panel 14. The user can specify, for example, a paper size or the number of copies of an original document by manipulating the operation panel 14.

The feed-conveyance control circuit 130 controls a motor group 131 for driving the pickup roller 18a, the paper feed roller 35, and the paper discharge roller 37. The feed-conveyance control circuit 130 controls the motor group 131 according to the detection result of the various sensors 70 based on a control signal from the CPU 100.

The image forming control circuit 140 controls the photosensitive drums 22, the chargers 23, the scanning heads 19Y, 19M, 19C and 19K, the developing devices 24 and the primary transfer roller 25 based on a control signal from the CPU 100.

Specifically, the image forming control circuit 140 controls the printing conditions of the image forming unit 17 based on information read from the RFID 220 by the reader-writer 90. For example, the image forming control circuit 140 controls the printing condition by controlling the charging voltage of the photosensitive drum 22 and a developing bias applied to a developing roller 24. The information read from the RFID 220 may include information regarding recycled composition of the paper P or other information related to setting of print conditions of the image forming unit 17.

The control device 80 controls the drive motor 151a for rotating the pressure roller 52 of the fixing device 50 based on the control signal from the CPU 100. In addition, the control device 80 controls the drive motor 151b for rotating the cam 303 of the pressure control mechanism 300 based on the conveyance position information on the paper P as acquired from the sensor 70, the position information on the RFID 220 in the paper P as acquired in advance, and the conveyance speed information for the paper P.

Reader-Writer

The reader-writer 90 is disposed at the downstream side of the fixing device 50. The reader-writer 90 is a device for reading data from the RFID 220 via near field communication (NFC) or writing data to the RFID 220. The reader-writer 90 operates according to, for example, a standard prescribed in ISO/IEC 1443 or ISO/IEC 18092. The reader-writer 90 notifies the control device 80 of a time at which a radio wave output from the RFID 220 is received.

Specifically, the reader-writer 90 reads the information regarding the component(s) of the recycled paper in the paper P from the RFID 220 embedded in the paper P. In addition, the reader-writer 90 can write information to the RFID 220 according to user input/selections. In addition, the reader-writer 90 functions as a measurement device for acquiring the position information of the RFID 220 in the paper P by measuring the time at which the radio wave output from the RFID 220 is received.

Figure 12:
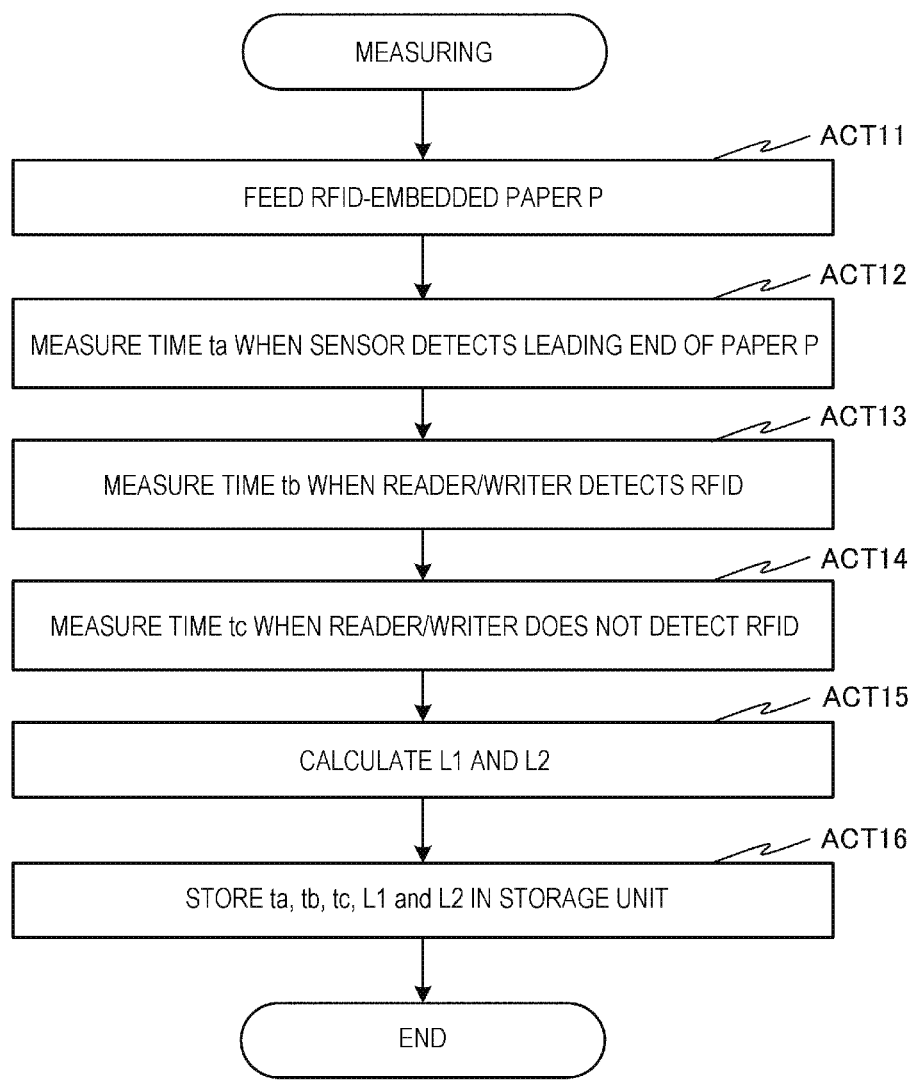
FIG. 12 is a flowchart for measuring of a position of RFID tag embedded in a sheet of paper.

Measuring of Embedded Position of an RFID Next, measuring of the embedded position of the RFID 220 using the reader-writer 90 will be described with reference to FIG. 12. The paper P with the RFID 220 embedded therein is loaded in the feed cassette 18. The user starts the measuring by pressing the measurement mode key 410 (illustrated in FIG. 5) or otherwise.

The control device 80 feeds a single sheet of the paper P (with the RFID 220 embedded therein) (ACT 11). The fed paper P is conveyed from feed cassette 18, through the sensor 70, the feed roller 35, the secondary transfer roller 33, the fixing device 50 and the reader-writer 90 to the discharge part 38.

The sensor 70 (provided at the upstream side of the fixing device 50) initially detects the conveyed paper P. The sensor 70 measures a TIME ta at which the leading end 210a of the paper P is detected and notifies the control device 80 of the measured TIME ta (ACT 12).

Once the measuring starts, the reader-writer 90 (provided at the downstream side of the fixing device 50) transmits an interrogation radio wave as defined in a NFC standard or otherwise. The RFID 220 embedded in the paper P eventually returns a response signal as defined by the NFC standard or otherwise when the interrogation radio wave is received. The reader-writer 90 receives the response signal (radio wave) returned from the RFID 220 and notifies the control device 80 of a TIME tb at which the response signal (radio wave) is received (ACT 13). In addition, the reader-writer 90 measures a TIME tc at which the response signal (radio wave) returned from the RFID 220 is not yet been received and notifies the control device 80 of this TIME tc (ACT 14).

Figure 13:
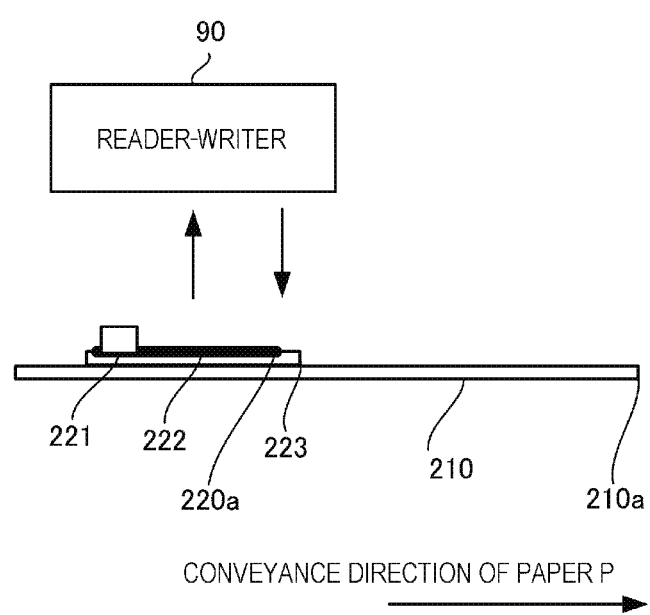
FIG. 13 is a view for describing aspects of a measuring of a position of RFID tag embedded in a sheet of paper.
Figure 14:
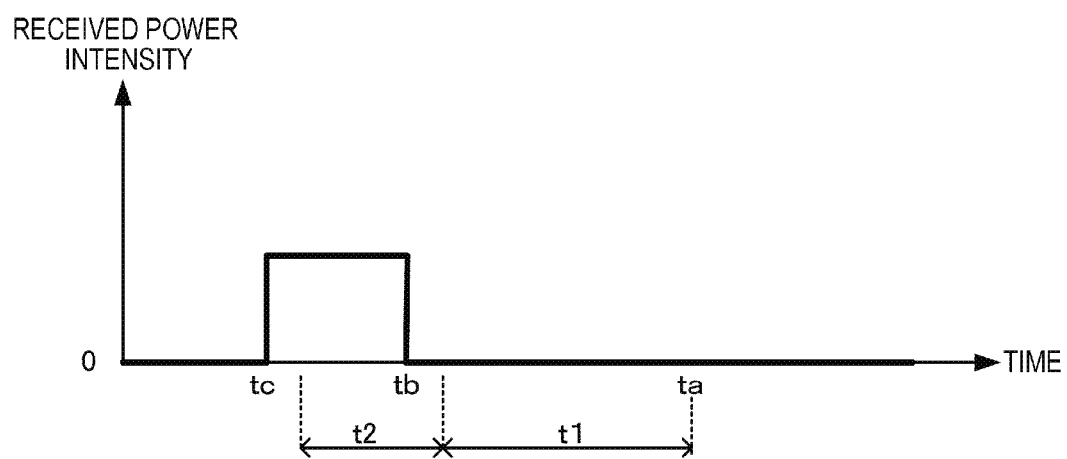
FIG. 14 is a view for describing aspects of a measuring of a position of RFID tag embedded in a sheet of paper.

Specifically, as illustrated in FIG. 13, when the antenna 222 of the RFID 220 reaches a position where the interrogation radio wave transmitted from the reader-writer 90 is received, the RFID 220 transmits the response signal (radio wave) based on the NFC standard (or otherwise) from the antenna 222 in response to the interrogation radio wave. FIG. 14 is a graph illustrating an example in which the power intensity of the radio wave received by the reader-writer 90 changes according to the measurement processing. The time when the RFID 220 begins to transmit the radio wave is TIME tb and the time when transmission of the radio wave ends is TIME tc.

The control device 80 calculates distances L1 and L2 (illustrated in FIG. 1) for a paper P based on the measured times (TIME ta, TIME tb and TIME tc) (ACT 15). Specifically, when the distance from the sensor 70 to the reader-writer 90 along the conveyance path is a value L0 and the conveyance speed of the paper P along the conveyance path is a value v1, the control device 80 performs calculations as follows:

$$L1 = (TIME\ tb - TIME\ ta)/v1 - L0$$

$$L2 = (TIME\ tc - TIME\ tb)/v1$$

The value L0 (distance from the sensor 70 to the reader-writer 90) and the conveyance speed (value v1) are known values set by design of the image forming apparatus. The conveyance speed (value v1) of the paper P is, for example, typically 10 cm/s to 50 cm/s in a MFP 10 or the like.

The control device 80 stores the measured times (TIMEs ta, tb and tc) and the calculated values (L1 and L2) in the storage unit (ACT 16) and finishes the measuring.

Image Editing Application Program

Figure 15:
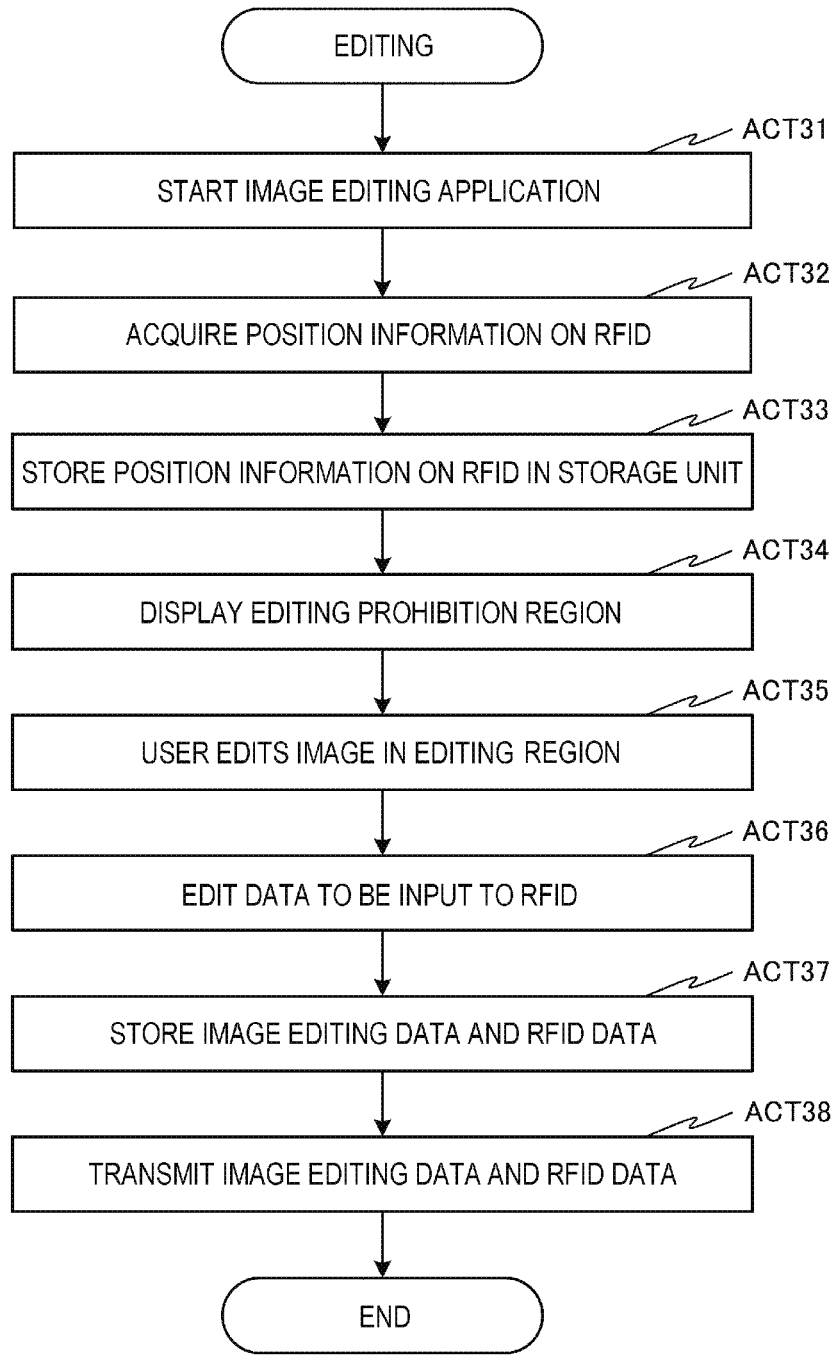
FIG. 15 is a flowchart for editing an image using an image editing application program.

Next, an image editing application program will be described with reference to FIG. 15. FIG. 15 is a flowchart of a processing when an image is edited using an image editing application program. The image editing application program is used when an image to be printed on the paper P is edited and is a program for presenting to the user the region of the paper P in which the RFID 220 has been embedded and indicating to the user that this region cannot be printed (that is the image to be printed on the paper P cannot overlap this excluded region of the paper P when printed). The image editing application program is loaded in the personal computer of a user in advance.

When the image to be printed on the paper P (with the RFID 220 embedded therein) is edited, the user starts the image editing application program (ACT 31). The personal computer accesses the MFP 10 and requests the position information for the RFID 220 in the paper P from the MFP 10. The MFP 10 transmits the position information to the personal computer through the interface 122. The personal computer acquires the requested position information for the RFID 220 in the paper P (ACT 32). The personal computer stores the position information in a storage unit (ACT 33).

Figure 16:
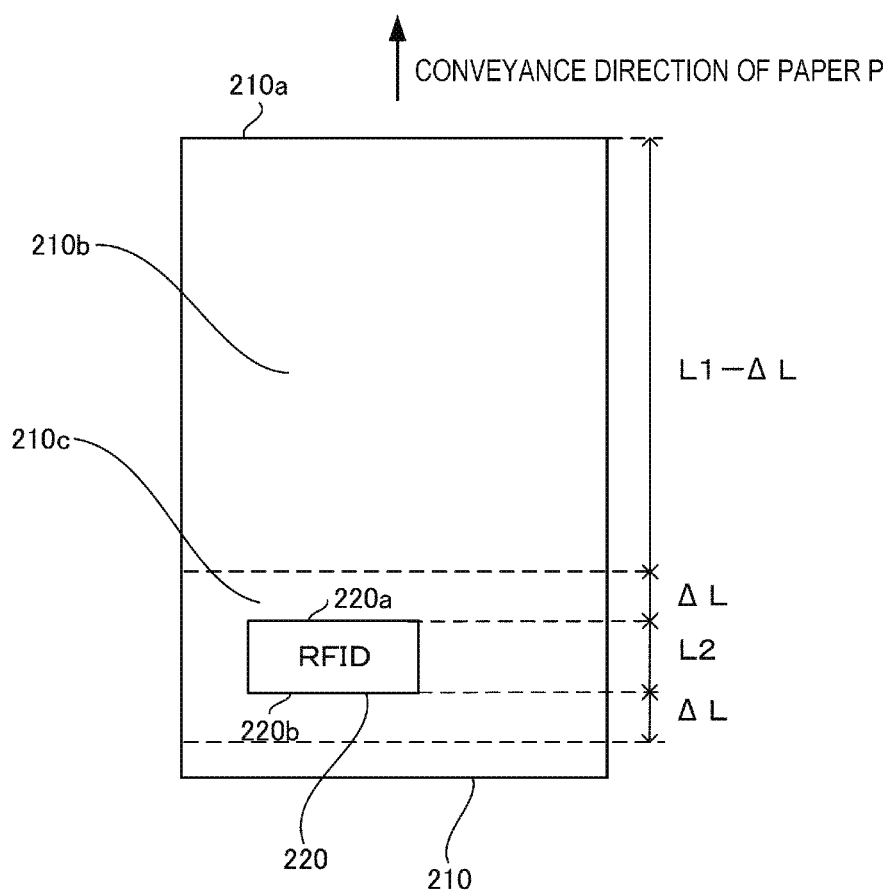
FIG. 16 is a view for describing aspects of an image editing application program.

The personal computer displays an editing prohibition region 210c for the paper P on a display screen (ACT 34). Specifically, the personal computer displays a region of the paper P from leading end 210a to a distance (L1−ΔL) as the editing region 210b, as illustrated in FIG. 16. In addition, the personal computer displays the region of paper P from the distance of (L1−ΔL) from the leading end 210a to the distance (L1+L2+ΔL) from the leading end 210a as the editing prohibition region 210c. In this context, the value ΔL is a safety margin provided to prevent the embedded RFID 220 from being damaged. The inclusion of this margin (ΔL) is optional, but may be about 0 to 10 mm in various examples.

The user then edits the image to be printed within the editing region 210b (ACT 35). In addition, the user may edit data to be input and stored in the RFID 220 (ACT 36). The RFID 220 may incorporate a storage region in which information input by the user can be recorded. The information to be input to the RFID 220 by the user is, for example, categorization information for purposes such as accounting, business use, or technical classifications. The user input information may be used for classifying data by a degree of importance, a creation date, and/or a creator. When searching a library of documents for a necessary document (or necessary document type), it may thus be possible to facilitate the document search operation by using an RFID reader. The personal computer stores the edited image data and the information to be input to the RFID 220, in the storage unit (ACT 37). The personal computer transmits the edited image data and the RFID data to the MFP 10 (ACT 38). Then, the editing is finished.

Printing

Figure 17:
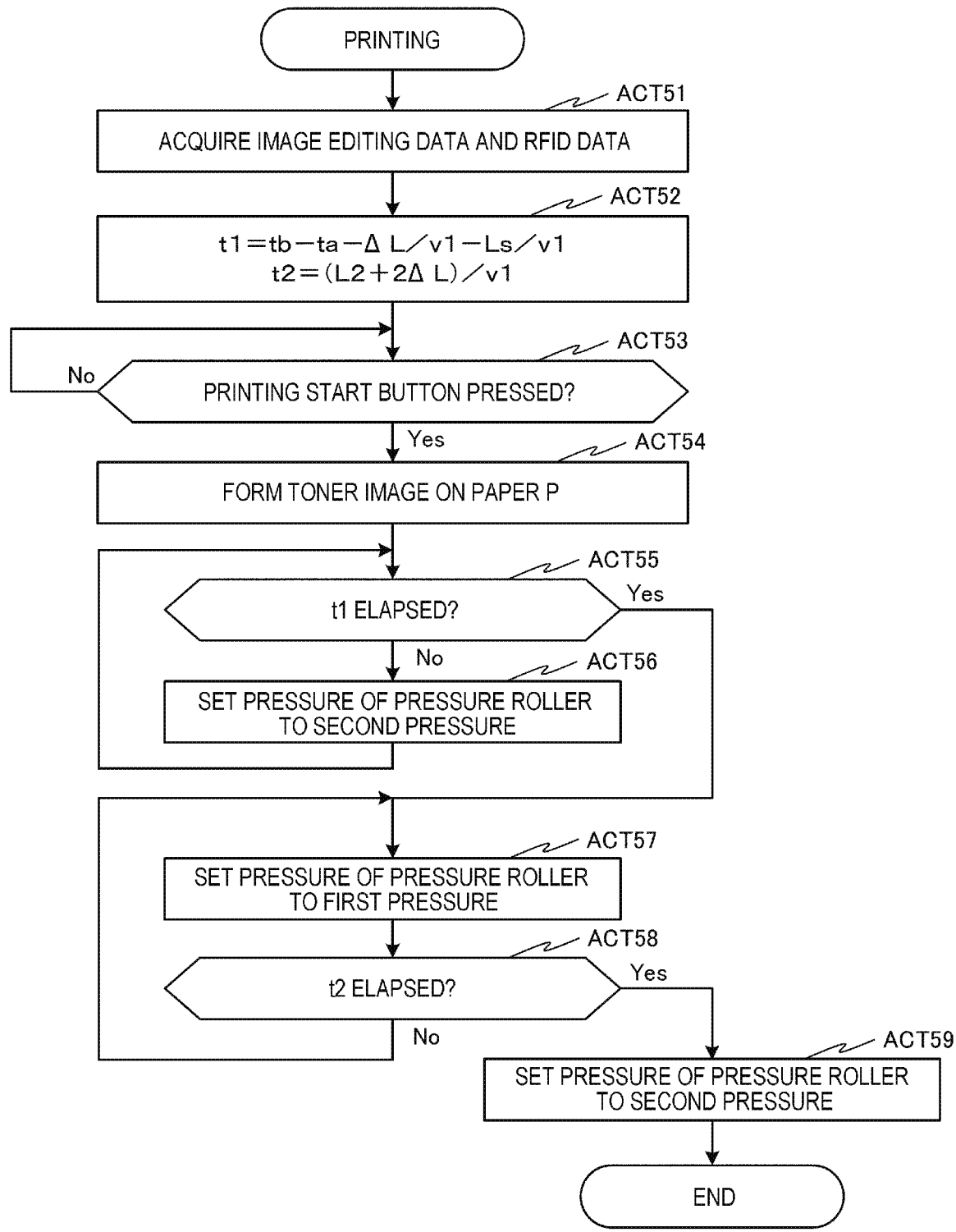
FIG. 17 is a flowchart of a printing process.

Next, a printing operation in which an image is formed on the paper P (with the RFID 220 embedded therein) will be described. FIG. 17 is a flowchart of printing. The TIME ta, the TIME tb, the TIME tc and the conveyance speed v1 (of the paper P) were already acquired in the above-described measuring processes. The distance (Ls) from the fixing device 50 to the reader-writer 90 and the value ΔL are also stored in the storage unit in advance.

When the user instructs printing, the MFP 10 acquires the edited image data and the user's RFID data (user data to be input to RFID 220) from the personal computer through the interface 122 (ACT 51).

Next, the control device 80 calculates the time t1 at which the pressing of the pressure roller 52 is switched from the second pressure to the first pressure after the sensor 70 detects the leading end 210a of the paper P. In addition, the control device 80 calculates the time t2 at which the pressing of the pressure roller 52 is switched from the first pressure to the second pressure. Specifically, the control device 80 performs the following calculation (ACT 52), and stores the calculated result in the storage unit:

$$t1=\text{TIME } tb-\text{TIME } ta-\Delta L/v1 - Ls/v1$$

$$t2=(\text{TIME } tc-\text{TIME } tb)+2\Delta L/v1$$

The control device 80 determines whether a printing start button 403 has been pressed (ACT 53). When the printing start button 403 has been pressed (ACT 53: Yes), the control device 80 feeds one sheet of paper P (with the RFID 220 embedded therein) from the feed cassette 18.

The image forming unit 17 forms a toner image on the paper P with settings based on the information such as the component of the recycled paper as read from the RFID 220 embedded in the paper P (ACT 54). Specifically, as illustrated in FIG. 4, the paper P taken out from the feed cassette 18 by the pickup roller 18a is conveyed by the feed roller 35 between the intermediate transfer belt 21 and the secondary transfer roller 33.

In parallel with the above operation, the toner images are respectively formed on the photosensitive drums 22 of the image forming units 20Y, 20M, 20C and 20K. The toner images formed on the photosensitive drums 22 of the image forming units 20Y, 20M, 20C and 20K are transferred in sequence onto the intermediate transfer belt 21. Therefore, the toner images of yellow (Y), magenta (M), cyan (C) and black (K) are formed on the intermediate transfer belt 21.

When the paper P passes through the intermediate transfer belt 21 and the secondary transfer roller 33, the toner image formed on the intermediate transfer belt 21 is transferred onto the paper P. Therefore, the toner image comprising the toners of yellow (Y), magenta (M), cyan (C) and black (K) is formed on the paper P.

The paper P next passes through the fixing device 50. The paper P is heated by passing through the fixing device 50. Therefore, the toner image is fixed to the paper P and the image is formed on the paper P. The fixing device 50 controls the pressing of the pressure roller 52 against the fixing belt 51 as paper P passes therethrough according to the measured position of the RFID 220 in the paper P.

The sensor 70 provided at the upstream side of the fixing device 50 detects the leading end 210a of the paper P and notifies the control device 80 of the detection. The control device 80 determines whether the time t1 has elapsed after receiving the notification of the detection (ACT 55). When the time t1 has not elapsed yet (ACT 55: No), the control device 80 controls the pressure control mechanism 300 to maintain the pressure of the pressure roller 52 at the second pressure (ACT 56). Specifically, the control device 80 controls the drive unit 302 such that the contact part 301c of the pressure control mechanism 300 is brought into contact with the convex part 303c of the cam 303. If the contact part 301c is in contact with the convex part 303c of the cam 303, the contact part 301c is pressed by the convex part 303c with strong pressure in the −X direction. The connection part 301a is pressed by the elastic body 301b in the −X direction. The plate 306, to which the connection part 301a is fixed, rotates using the hole 307 as a support point in a clockwise direction. Therefore, the pressure roller 52 fixed to the plate 306 is brought into contact with the fixing belt 51 with strong pressure (second pressure).

After the time t1 has elapsed (ACT 55: Yes), the control device 80 controls the pressure control mechanism 300 such that the pressing of the pressure roller 52 is changed from the second pressure to the first pressure (ACT 57). Specifically, the control device 80 controls the drive unit 302 such that the contact part 301c of the pressure control mechanism 300 is brought into contact with the concave part 303b of the cam 303. When the contact part 301c is in contact with the concave part 303b of the cam 303, the force for compressing the elastic body 301b is reduced. Therefore, the pressure roller 52 fixed to the plate 306 is brought into contact with the fixing belt 51 with a pressure (e.g., a first pressure) that is weaker than the second pressure. Therefore, it is possible to reduce damage to the RFID 220 that might otherwise be caused by a high pressing force.

Next, the control device 80 determines whether the time t2 has elapsed from when the pressure roller 52 was changed to lower pressure pressing (e.g., pressing at the first pressure) (ACT 58). When the time t2 has not elapsed yet (ACT 58: No), the control device 80 controls the pressure control mechanism 300 to maintain the pressing of the pressure roller 52 at the lower pressure (ACT 57). Specifically, the control device 80 controls the drive unit 302 such that the contact part 301c of the pressure control mechanism 300 is brought into contact with the concave part 303b.

Once the time t2 has elapsed (ACT 58: Yes), the control device 80 controls the pressure control mechanism 300 such that the pressing of the pressure roller 52 is changed from the lower pressure to the higher pressure (e.g., second pressure) (ACT 59). Specifically, the control device 80 controls the drive unit 302 such that the contact part 301c of the pressure control mechanism 300 is brought into contact with the convex part 303c of the cam 303.

The paper P, on which the printed image has been formed, is discharged to the discharge part 38 by the discharge roller 37. With the above process, the printing of the first sheet is finished. For the printing of a second and subsequent sheets, the processing from ACT 53 to ACT 59 is repeated.

Modification 1

In the above example, the case where the embedded position of the RFID 220 in the paper P is measured in the MFP 10 was described. However, in some embodiments, the embedded position of the RFID 220 in the paper P may already be known. In such a case, the MFP 10 may acquire the position information for the RFID 220 in the paper P through the operation panel 14 or the interface 122. In addition, if the embedded position of the RFID 220 within the paper P is set by some standard, the position information for the RFID 220 may be stored in advance in the MFP 10.

In addition, the above-described processing flowcharts are exemplary and the present disclosure is not limited thereto. For example, in the measuring process illustrated in FIG. 12, the control device 80 may perform the processes from ACT 11 to ACT 16 several plural times and perform a statistical analysis on the obtained results.

In addition, in the above description, the case where the RFID 220 and the reader-writer 90 operate based on a standard defined in ISO/IEC 1443 or ISO/IEC 18092 was described. However, the short-range wireless communication does not need to be limited to these standards. For example, any newly established or adopted standard or any proprietary standard as defined or adopted by a manufacturer may be utilized.

In addition, the communication distance of an RFID system is generally about 10 cm. However, if the embedded position of the RFID 220 is being measured using the reader-writer 90, it may be possible to improve measurement accuracy by shortening the communication distance to 1 cm, for example. In addition, by increasing the directivity of the antenna of the reader-writer 90, it may be possible to improve measurement accuracy.

As described above, the MFP 10 according to the first embodiment includes the pressure control mechanism 300, and controls, when the paper P (embedded with the RFID 220) passes through the fixing device 50, the pressure for pressing the pressure roller 52 against the fixing belt 51 when the paper P region including the RFID 220 passes through the nip to be lower than the pressure used for pressing the pressure roller 52 against the fixing belt 51 when a region of the paper P not including the RFID 220 passes through the nip. Therefore, it is possible to reduce damage to the RFID 220 embedded in the paper P.

The pressure control mechanism 300 includes the drive unit 302 including the cam 303 formed with the concave part 303b in the portion of the outer circumference thereof. The elastic unit 301, one end of which is connected to the pressure roller 52 and the other end contacting the outer circumference of the cam 303, expands and contracts based on the shape of the rotating cam 303 to change the pressing of the pressure roller 52 against the fixing belt 51. Therefore, it is possible to control the pressure of the pressing of the pressure roller 52 against the fixing belt 51 based on the rotation of the cam 303 and the shape of the outer circumference of the cam 303.

In addition, the MFP 10 according to the first embodiment includes a measurement device for measuring the position of the RFID 220 in the paper P using the reader-writer 90. Therefore, it is possible to measure the position of the RFID 220 in the paper P. In addition, it is possible to present the region of the paper P in which the RFID 220 is embedded as an editing prohibition region 210c.

In addition, since the pressure of the pressing by pressure roller 52 against the fixing belt 51 decreases, it is possible to reduce the amount of heat transferred from the heater 60 to the paper P. Therefore, by the same mechanisms as described above is possible to reduce the amount of heat applied to the RFID 220 and thus also reduce heat-induced damage to the RFID 220.

Second Embodiment

In the first embodiment, the method of controlling the pressing of the pressure roller 52 against the fixing belt 51 based on the shape of the outer circumference of the cam 303 was described. In this first embodiment, the reduced pressure of the pressing the pressure roller 52 against the fixing belt 51 when the region of the paper P embedded with the RFID 220 passes through the nip is not zero. In the second embodiment, when the region of the paper P embedded with the RFID 220 passes through the nip, the pulling of the pressure roller 52 away from the fixing belt 51 to set the pressing to zero pressure will be described.

Figure 18:
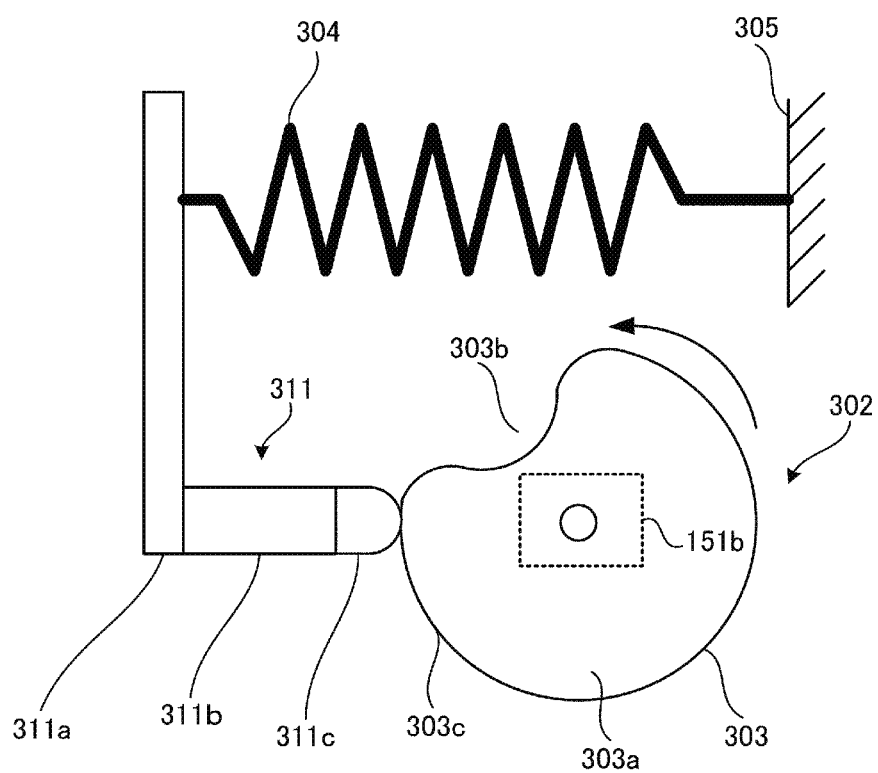
FIG. 18 is a view illustrating a configuration of a pressure control mechanism according to a second embodiment.
Figure 19:
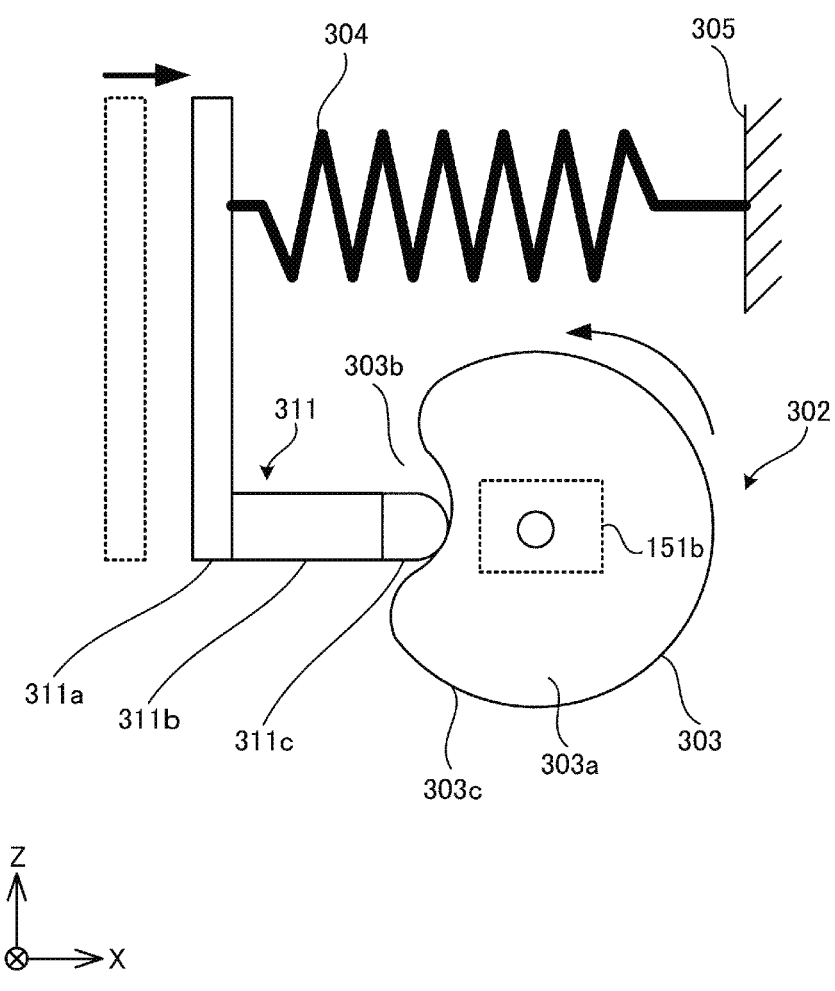
FIG. 19 is a view depicting aspects of a pressure control mechanism according to a second embodiment.

FIGS. 18 and 19 are schematic views illustrating a pressure control mechanism according to the second embodiment. As illustrated in FIG. 18, the pressure control mechanism according to the second embodiment includes a pressing unit 311, a drive unit 302 and a pulling unit 304. The pressing unit 311 includes a connection part 311a, a support part 311b, and a contact part 311c. The support part 311b is formed, for example, of a rigid resin, aluminum, or the like. The drive unit 302 is equivalent in function to that of the first embodiment.

The pulling unit 304 is a spring, for example. One end of the pulling unit 304 is fixed to the connection part 311a, and the other end is fixed to the case 305 of the fixing device 50. The connection part 311a is connected to the pressure roller 52. The pulling unit 304 pulls the connection part 311a in the direction (+X direction) towards the case 305. The pulling unit 304 acts to pull the pressure roller 52 away from the fixing belt 51.

As illustrated in FIG. 18, when the contact part 311c is in contact with the convex part 303c of the cam 303, the pulling unit 304 fixed to the connection part 311a may be pulled towards the −X direction. Therefore, the pressure roller 52 connected to the connector part 311a is still pressed against the fixing belt 51 at some pressure (e.g., the second pressure).

As illustrated in FIG. 19, when the contact part 311c is in contact with the concave part 303b of the cam 303, the connection part 311a is pulled by the elastic force of the pulling unit 304 in the +X direction. Therefore, the pressure roller 52 connected to the connection part 311a can be pulled away from the fixing belt 51.

Figure 20:
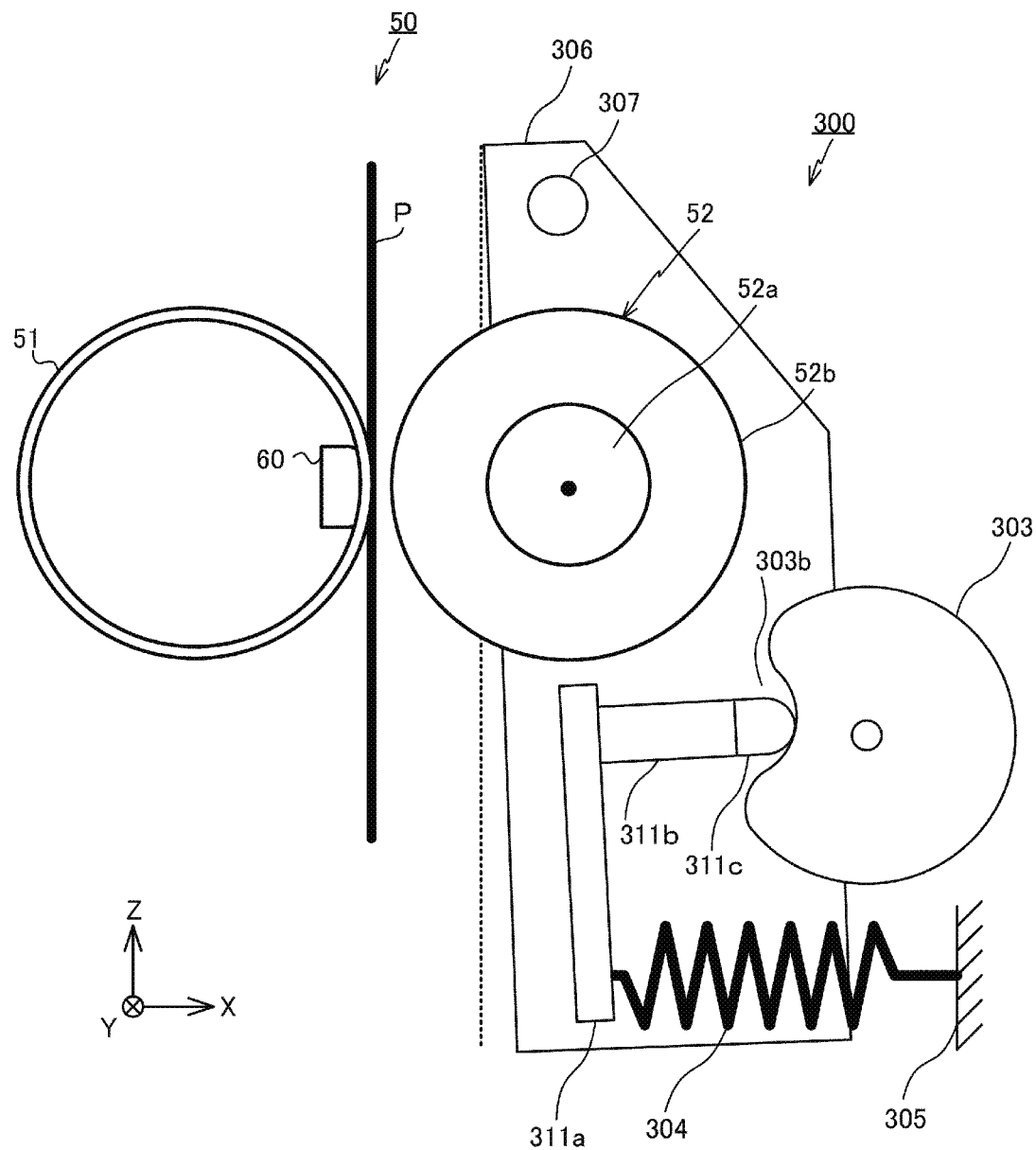
FIG. 20 is a view depicting aspects of a configuration of a pressure control mechanism according to a second embodiment.

FIG. 20 illustrates amounting example of a pressure control mechanism 300 according to the second embodiment. The core material 52a of the pressure roller 52 and the connection part 311a are fixed to the plate 306. The plate 306 is formed in a trapezoidal shape and includes a hole 307 in one end thereof. The plate 306 is rotatably fixed to a case 305 using the hole 307. The cam 303 is supported by the drive motor 151b. One end of the pulling unit 304 is fixed to the connection part 311a and the other end thereof is fixed to the case 305 of the fixing device 50.

When the contact part 311c is in contact with the convex part 303c of the cam 303, the contact part 311c is pressed by with strong pressure towards the −X direction. The connection part 311a is pressed in the −X direction by the support part 311b. The plate 306, to which the connection part 311a is fixed, rotates about the hole 307 as a support point in a clockwise direction. Therefore, the pressure roller 52 fixed to the plate 306 is brought into contact with the fixing belt 51 with a strong pressure (e.g., second pressure). When the contact part 311c is in contact with the concave part 303b of the cam 303, the plate 306, to which the connection part 311a is fixed, rotates using the hole 307 as a support point in a counterclockwise direction. Therefore, the pressure roller 52 is pulled away from the fixing belt 51 by the pulling unit 304. Therefore, it is possible to reduce damage to the RFID 220.

The pressure control mechanism 300 of the fixing device 50 according to the second embodiment includes a pulling unit 304. Therefore, when the region of the paper P including the RFID 220 passes through the nip, the pressure roller 52 can be pulled away from the fixing belt 51 and the pressure applied to the RFID 220 may be set to substantially zero. Therefore, it is possible to further reduce a possibility of damaged to RFID 220.

Modification 2

The support part 311b illustrated in FIGS. 18 and 19 corresponds in position to the elastic member 301b described in the first embodiment. It is possible to incorporate the elastic member 301b in the support part 311b, to adjust the pressing by pressure roller 52 to any appropriate pressure by appropriately adjusting the spring constants of the elastic body 301b and the pulling unit 304.

Third Embodiment

In the first embodiment, the case where the reader-writer 90 is used as the measurement device for measuring the embedding position of the RFID 220 was described. In the third embodiment, the method of measuring the position of the RFID 220 using a wireless transmitter 90a and receiver 90b will be described.

Figure 21:
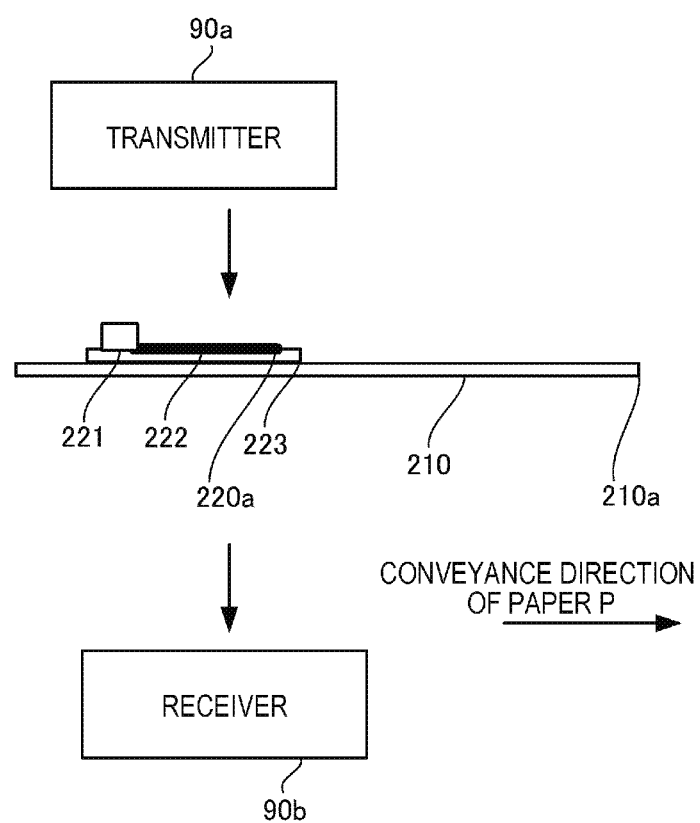
FIG. 21 depicts aspects of measuring of a position of RFID tag embedded in a sheet of paper according to a third and a fourth embodiment.
Figure 22:
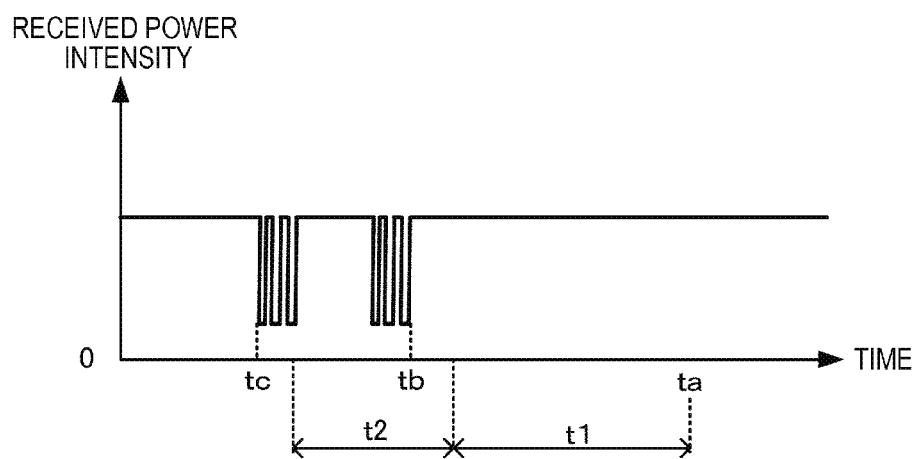
FIG. 22 depicts aspect of a measuring of an RFID tag position according to a third and fourth embodiment.

As illustrated in FIG. 21, a measurement device includes the transmitter 90a and the receiver 90b. The transmitter 90a is a device for transmitting a radio wave at 100 MHz, for example. The transmission frequency is determined in consideration of the size of the antenna and the wraparound characteristics of the radio wave. The receiver 90b is a device capable of measuring the received power intensity of a radio wave at a frequency in the vicinity of 100 MHz. Upper paper 211 and lower paper 212 allow radio waves to pass therethrough, but IC chip 221 and antenna 222 block the radio wave in the vicinity of 100 MHz. Therefore, when the IC chip 221 and the antenna 222 pass between the transmitter 90a and the receiver 90b, the power intensity of the radio wave received by the receiver 90b changes as illustrated in FIG. 22. The received power intensity of the radio wave is reduced at a time tb due to presence of the antenna 222. If the antenna 222 includes three rings (see e.g., FIG. 3), then received power intensity cycles between strong and weak three times between an outer edge and a center. The calculation method for the times t1 and t2 may be the same as the first embodiment.

If the embedding position of the RFID 220 is measured using this method, it is possible to eliminate the measurement errors that might be due to the response time lags of the RFID 220 and to more accurately measure the embedded position of the RFID 220.

Fourth Embodiment

In the fourth embodiment, the transmitter 90a is a light transmitter and the receiver 90b is a light intensity measurement device. When the IC chip 221 and the antenna 222 of the RFID 220 in the paper P pass between the transmitter 90a and the receiver 90b, the light reception intensity measured by the receiver 90b is reduced. The intensity of light measured by the receiver 90b changes in the same manner as illustrated in FIG. 22. The subsequent process is the same as the third embodiment.

When the embedding position of the RFID 220 is measured using light, it is possible to eliminate measurement error due to the response lag time of the RFID 220 and to more accurately measure the embedded position of the RFID 220.

In addition, although the case where the pressure control mechanism. 300 includes a cam 303 was described, the configuration of the pressure control mechanism 300 is not limited thereto. For example, it is possible some embodiments to change the pressure of the pressing by the pressure roller 52 against the fixing belt 51 using an electromagnet. Specifically, it is possible to control the pressing by the pressure roller 52 against the fixing belt 51 by controlling a current flowing to an electromagnet and thereby control the intensity of a force applied to the pressure roller 52 by varying a magnetic force generated by the electromagnet.

Figure 23:
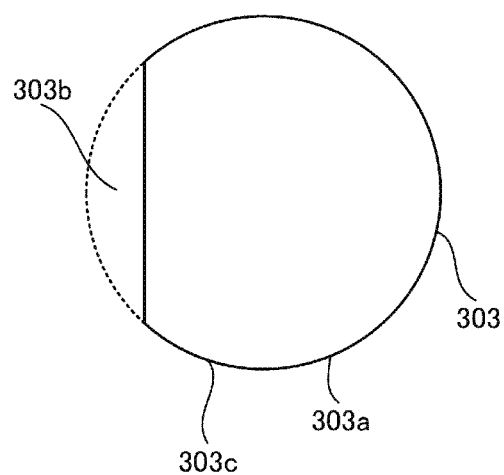
FIG. 23 is a view illustrating a configuration of a cam.

In addition, although mounting examples of a pressure control mechanism 300 were described with reference to FIGS. 10 and 20, other mounting methods may be used. For example, the shape of the plate 306 of the pressure control mechanism 300 illustrated in FIG. 20 may be changed or the position of each part may be changed. In addition, the shape of the concave part 303b of the cam 303 may be the clipped shape illustrated in FIG. 23, for example. In general, the shape of the concave part 303b can be designed in consideration of the desired change in pressure of the pressing of the pressure roller 52 against the fixing belt 51.

In addition, the case where the RFID 220 is between the upper paper 211 and the lower paper 212 was described. However, a recording medium incorporating the RFID 220 therein is not limited thereto. For example, in some embodiments, an adhesive may be applied to one side of the mount 223 of the RFID 220 and be adhered to one surface of the paper 210.

In addition, the margin value ΔL was described as about 0 to 10 mm. However, the range of margin value ΔL is not limited thereto. In the RFID 220, the connections between the IC chip and the antenna tend to be weak points in terms of pressure resistance/durability. Thus, if the antenna 222 is itself robust in terms of heat and pressure resistance, the margin value ΔL may be set to a negative value such that editing prohibition region 201c might incorporate certain portions of RFID 220 occupied by antenna 222.

In the above embodiments, the fixing device 50 heats the paper P using the heater 60 through the fixing belt 51. However, the exemplary embodiment is not limited thereto and the fixing device 50 may heat the fixing belt 51 using a halogen lamp heater or the like. In addition, the fixing device 50 may be an induction heating (IH) fixing device that heats the fixing belt 51 by inductive methods.

In the above example embodiments, the fixing device 50 includes a cylindrical-shaped fixing belt 51 as a fixing element. However, the shape of the fixing belt 51 (or fixing element) is not limited thereto. For example, as illustrated in FIG. 24, a fixing device 500 including a fixing belt 51 stretching over a plurality of rollers may be used as the fixing device in the MFP 10.

Figure 24:
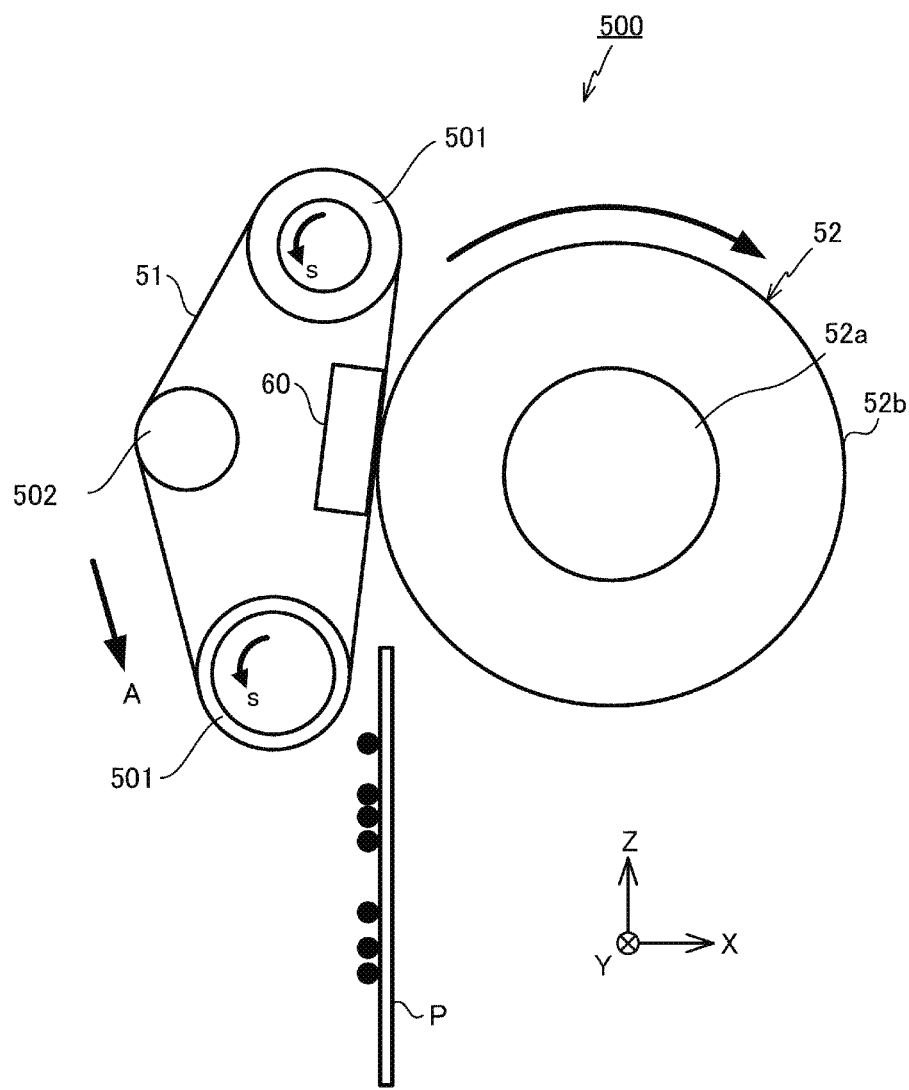
FIG. 24 is a view illustrating a configuration of a fixing device.

As illustrated in FIG. 24, in a fixing device 500, the fixing belt 51 stretches over drive rollers 501 for rotating the fixing belt 51 and a tension roller 502 for applying tension to the fixing belt 51. The fixing belt 51 rotates in a direction indicated by arrow A by rotation of the drive rollers 501 in a direction indicated by arrow s.

In the fixing device 500, the pressure roller 52 is pressed against a heater 60 contacting the inside of the fixing belt 51, thereby forming a nip between the fixing belt 51 and the pressure roller 52. The paper P is heated by the heater 60 as it passes through nip 51. Thereby, the toner image can be fixed to the paper P.

In the above example embodiments, the case where the image forming apparatus is a multifunctional peripheral was described. The present disclosure is not limited thereto and the image forming apparatus 10 may be a laser printer or the like.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A fixing device, comprising:
a fixing element;
a press roller configured to press against the fixing element to form a nip through which a sheet to be printed passes; and
a pressure control mechanism configured to control a pressing of the press roller against the fixing element according to a position of a radio frequency identification (RFID) tag embedded in the sheet such that a pressure of the press roller against the fixing element is at a first pressure when the RFID tag passes through the nip and at a second pressure otherwise, the first pressure being less than the second pressure, wherein
the pressure control mechanism includes:
a drive unit including:
a cam having a concave part on an outer circumference portion, and
a drive motor to rotate the cam;
a pressing unit having a first end connected to the press roller and a second end contacting the outer circumference portion of the cam; and
a pulling unit configured to pull the press roller away from the fixing element.

2. The fixing device according to claim 1, wherein the concave portion of the cam comprises a flat portion of the outer circumference portion of the cam.

3. A fixing device, comprising:
a fixing element;
a press roller configured to press against the fixing element to form a nip through which a sheet to be printed passes; and
a pressure control mechanism configured to control a pressing of the press roller against the fixing element according to a position of a radio frequency identification (RFID) tag embedded in the sheet such that a pressure of the press roller against the fixing element is at a first pressure when a RFID region of the sheet including the RFID tag passes through the nip and at a second pressure otherwise, the first pressure being less than the second pressure, wherein
the pressure control mechanism includes:
a drive unit including:
a cam having a concave part in an outer circumference portion, and
a drive motor to rotate the cam; and
a spring-type component having a first end connected to the press roller and a second end contacting the outer circumference portion of the cam.

4. The fixing device according to claim 1, further comprising:
an outer case, wherein
the pulling unit is a spring-type component having a first end connected to the pressure roller and a second end connected to the outer case.

5. The fixing device according to claim 4, further comprising:
a mounting plate on which the press roller is mounted, the mounted plate including a mounting hole permitting rotation of the mounting plate about the mounting hole.

6. The fixing device according to claim 1, further comprising:
a mounting plate on which the press roller is mounted, the mounted plate including a mounting hole permitting rotation of the mounting plate about the mounting hole.

7. The fixing device according to claim 3, wherein the pressure control mechanism further includes a pulling unit configured to pull the press roller away from the fixing element.

8. An image forming apparatus, comprising:
an image forming unit to form a toner image on a sheet;
a fixing device to receive the sheet from the image forming unit, the fixing device including:
a fixing element;
a press roller configured to press against the fixing element to form a nip through which the sheet passes in a sheet conveyance direction; and
a pressure control mechanism configured to control a pressure of the press roller against the fixing element to be at a first pressure when a first region of the sheet passes through the nip in the sheet conveyance direction and at a second pressure otherwise, the first pressure being less than the second pressure;

a control device configured to control the pressure control mechanism to switch between the first pressure and the second pressure; and a sensor to detect a position of the sheet on a conveyance path, wherein the first region of the sheet includes a radio frequency identification (RFID) tag therein, and the control device switches between the first pressure and the second pressure based on a conveyance position information of the sheet acquired from the sensor, position information of the RFID tag on the sheet, and a conveyance speed of the sheet.

9. The image forming apparatus according to claim 8, further comprising:

a measurement device configured to measure a position of the first region of the sheet as a distance from a leading edge of the sheet.

10. The image forming apparatus according to claim 9, wherein the measurement device includes an RFID reader-writer configured to read data from and write data to the RFID tag, and the position of the first region is measured according to a detection of a response signal from the RFID tag.

11. The image forming apparatus according to claim 9, wherein the measurement device includes a light transmitter and a light receiver configured to pass light through the sheet, and the position of the first region is measured based on a change in intensity of light received by the light receiver.

12. The image forming apparatus according to claim 8, further comprising:

an RFID reader-writer configured to read data from and write data to the RFID tag.

13. The image forming apparatus according to claim 8, further comprising:

a communication circuit configured to transmit the position of the first region to an external information processing device.

14. The image forming apparatus according to claim 8, wherein pressure control mechanism includes:

a drive unit including:

a cam having a concave part in an outer circumference portion, and a drive motor to rotate the cam; and a spring-type component having a first end connected to the press roller and a second end contacting the outer circumference portion of the cam.

15. The image forming apparatus according to claim 8, wherein the pressure control mechanism includes:

a drive unit including:

a cam having a concave part on an outer circumference portion, and a drive motor to rotate the cam;

a pressing unit having a first end connected to the press roller and a second end contacting the outer circumference portion of the cam; and a pulling unit configured to pull the press roller away from the fixing element.

16. The fixing device according to claim 3, wherein the spring-type component is a spring.

17. The fixing device according to claim 3, wherein the concave portion of the cam comprises a flat portion of the outer circumference portion of the cam.

18. The fixing device according to claim 3, further comprising:

a mounting plate on which the press roller is mounted, the mounted plate including a mounting hole permitting rotation of the mounting plate about the mounting hole.

19. The image forming apparatus according to claim 8, wherein pressure control mechanism includes:

a drive unit including a cam having a concave part in an outer circumference portion, and a drive motor to rotate the cam.

20. The image forming apparatus according to claim 14, wherein the spring-type component is a spring.

* * * * *